US012555546B2

(12) United States Patent
Kwon et al.

(10) Patent No.: US 12,555,546 B2
(45) Date of Patent: Feb. 17, 2026

(54) GATE DRIVING CIRCUIT AND DISPLAY DEVICE INCLUDING THE SAME

(71) Applicant: LG Display Co., Ltd., Seoul (KR)

(72) Inventors: Yong Chul Kwon, Paju-si (KR); Dong Won Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/935,283

(22) Filed: Nov. 1, 2024

(65) Prior Publication Data

US 2025/0201198 A1 Jun. 19, 2025

(30) Foreign Application Priority Data

Dec. 19, 2023 (KR) ........................ 10-2023-0185938

(51) Int. Cl.

| | |
|---|---|
| ***G09G 3/10*** | (2006.01) |
| ***G09G 3/3233*** | (2016.01) |
| ***G09G 3/3266*** | (2016.01) |
| *G09G 3/32* | (2016.01) |

(52) U.S. Cl.

CPC ......... *G09G 3/3266* (2013.01); *G09G 3/3233* (2013.01); *G09G 3/32* (2013.01); *G09G 2300/0819* (2013.01); *G09G 2300/0842* (2013.01); *G09G 2310/0286* (2013.01); *G09G 2310/0289* (2013.01); *G09G 2310/066* (2013.01); *G09G 2320/0233* (2013.01); *G09G 2320/0242* (2013.01); *G09G 2320/064* (2013.01); *G09G 2320/0673* (2013.01); *G09G 2330/023* (2013.01)

(58) Field of Classification Search

CPC ...... G09G 3/3266; G09G 3/3233; G09G 3/32; G09G 2300/0819; G09G 2300/0842; G09G 2310/0286; G09G 2310/0289; G09G 2310/066; G09G 2320/0233; G09G 2320/0242; G09G 2320/064; G09G 2320/0673; G09G 2330/023; G09G 3/3241

USPC ...................................................... 315/169.3

See application file for complete search history.

(56) References Cited

U.S. PATENT DOCUMENTS

2003/0076048 A1* 4/2003 Rutherford .......... G09G 3/3241 315/169.3

FOREIGN PATENT DOCUMENTS

| | | |
|---|---|---|
| KR | 10-2022-0037329 A | 3/2022 |
| KR | 10-2023-0013608 A | 1/2023 |
| KR | 10-2023-0031704 A | 3/2023 |

* cited by examiner

*Primary Examiner* — Abdul-Samad A Adediran

(74) *Attorney, Agent, or Firm* — Morgan, Lewis & Bockius LLP

(57) ABSTRACT

A gate driving circuit may include a gate signal generating circuit configured to sequentially output at least one gate signal having a square wave pulse, and a ramp voltage generating circuit configured to receive the at least one gate signal and a slope data voltage to output a ramp voltage signal including a ramp waveform based on the square wave pulse of the at least one gate signal and on the slope data voltage.

21 Claims, 20 Drawing Sheets

GATE DRIVING CIRCUIT AND DISPLAY DEVICE INCLUDING THE SAME

CROSS-REFERENCE TO RELATED APPLICATION

This application claims priority to and the benefit of Korean Patent Application No. 10-2023-0185938, filed on Dec. 19, 2023, the disclosure of which is incorporated herein by reference in its entirety.

BACKGROUND

Field

The present disclosure relates to a gate driving circuit and a display device including the same.

Discussion of Related Art

A variety of flat panel displays are known, including electroluminescence displays (ELD) such as liquid crystal displays (LCD) and organic light-emitting diode (OLED) displays, field emission displays (FED), plasma display panels (PDP), and electrophoresis displays (EPD).

A display device includes a display panel having pixels arranged to display an input image, and a display panel driving circuit that writes data to the pixels of the display panel. The display panel driving circuit includes a data driving circuit that supplies a data voltage to data lines of the display panel, and a gate driving circuit that supplies a gate signal to gate lines of the display panel.

The gate driving circuit outputs a pulse-shaped gate signal. The gate signal may include a scan signal, an emission signal, and the like. When the gate signal is applied as a ramp waveform, it offers a number of design advantages in improving the driving characteristics and the image quality of the pixels. However, a conventional gate driving circuit could not output a gate signal of a ramp waveform.

SUMMARY

Accordingly, the present disclosure is directed to a gate driving circuit and a display device including the same that substantially obviate one or more of the problems due to limitations and disadvantages of the related art.

The present disclosure is to provide a gate driving circuit capable of outputting a ramp voltage signal, and a display device including the same.

The objects of the present disclosure are not limited to the above-described objects, and other objects not mentioned can be clearly understood by those skilled in the art from the following description.

To achieve these objects and other advantages of the present disclosure, as embodied and broadly described herein, a gate driving circuit may include: a gate signal generating circuit configured to sequentially output at least one gate signal having a square wave pulse; and a ramp voltage generating circuit configured to receive the at least one gate signal and a slope data voltage and to output a ramp voltage signal including a ramp waveform based on the square wave pulse of the at least one gate signal and on the slope data voltage.

In some example embodiments, the at least one gate signal may include a (n−1)th scan signal and an nth scan signal following the (n−1)th scan signal, n being a natural number. The ramp voltage generating circuit may include: a driving transistor including a first electrode configured to receive a driving voltage, a gate electrode connected to a first node, and a second electrode connected to a second node; a first capacitor connected between a VDD node configured to receive a driving voltage and the first node; a first switch transistor connected between a data line configured to receive the slope data voltage and the first node, the first switching transistor being configured to turn on in response to a gate-on voltage of the nth scan signal; a second switch transistor connected between the second node and a reference voltage node configured to receive a reference voltage lower than the driving voltage, or connected between the second node and a ground node, the second switch transistor being configured to turn on in response to a gate-on voltage of the (n−1)th scan signal; and a second capacitor connected between the second node and the ground node, or connected between the second node and the reference voltage node. The square wave pulse of the (n−1)th scan signal may have the gate-on voltage of the (n−1)th scan signal, and the square wave pulse of the nth scan signal may have the gate-on voltage of the nth scan signal.

In some example embodiments, the at least one gate signal may include a scan signal. The ramp voltage generating circuit may include: a driving transistor including a first electrode configured to receive a driving voltage, a gate electrode connected to a first node, and a second electrode connected to a second node; a first capacitor connected between a VDD node configured to receive the driving voltage and the first node; a first switch transistor connected between a data line configured to receive the slope data voltage and the first node, the first switch transistor being configured to turn on in response to a gate-on voltage of the scan signal; a second switch transistor connected between the second node and a reference voltage node configured to receive a reference voltage lower than the driving voltage, or connected between the second node and a ground node, the second switch transistor being configured to turn on in response to the gate-on voltage of the scan signal; and a second capacitor connected between the second node and the ground node, or connected between the second node and the reference voltage node. The square wave pulse of the scan signal may have the gate-on voltage.

In some example embodiments, the at least one gate signal may include a (n−1)th scan signal, an nth scan signal following the (n−1)th scan signal, and a ramp switching signal, n being a natural number. The square wave pulse of the ramp switching signal may overlap the square wave pulse of the (n−1)th scan signal and the square wave pulse of the nth scan signal. The ramp voltage generating circuit may include: a driving transistor including a first electrode connected to a first node, a gate electrode connected to a second node, and a second electrode connected to a third node; a first capacitor connected between a VDD node configured to receive a driving voltage and the second node; a first switch transistor connected between the VDD node and the first node and configured to turn on in response to a gate-on voltage of the ramp switching signal; a second switch transistor connected between a data line configured to receive the slope data voltage and the first node, and configured to turn on in response to a gate-on voltage of the nth scan signal; a third switch transistor connected between the second node and the third node and configured to turn on in response to the gate-on voltage of the nth scan signal; a fourth switch transistor connected between the second node and an initialization voltage node configured to receive an initialization voltage, and configured to turn on in response to a gate-on voltage of the (n−1)th scan signal; a fifth switch transistor connected between the third node and a fourth node and configured to turn on in response to the gate-on voltage of the ramp switching signal; a sixth switch transistor connected between the fourth node and a reference voltage node configured to receive a reference voltage, or connected between the fourth node and a ground node, the sixth switch transistor being configured to turn on in response to the gate-on voltage of the (n−1)th scan signal; and a second capacitor connected between the fourth node and the reference voltage node, or connected between the fourth node and the ground node. The square wave pulse of the (n−1)th scan signal may have the gate-on voltage of the (n−1)th scan signal, and the square wave pulse of the nth scan signal may have the gate-on voltage of the nth scan signal. The square wave pulse of the ramp switching signal may have a gate-off voltage, and the ramp switching signal may be at the gate-on voltage following the square wave pulse of the ramp switching signal.

In some example embodiments, the first switch transistor may include a first electrode connected to the VDD node, a gate electrode configured to receive the ramp switching signal, and a second electrode connected to the first node. The second switch transistor may include a first electrode connected to the data line, a gate electrode configured to receive the nth scan signal, and a second electrode connected to the first node. The third switch transistor may include a first electrode connected to the second node, a gate electrode configured to receive the nth scan signal, and a second electrode connected to the third node. The fourth switch transistor may include a first electrode connected to the second node, a gate electrode configured to receive the (n−1)th scan signal, and a second electrode connected to the initialization voltage node. The fifth switch transistor may include a first electrode connected to the third node, a gate electrode configured to receive the ramp switching signal and a second electrode connected to the fourth node. The sixth switch transistor may include a first electrode connected to the fourth node, a gate electrode configured to receive the (n−1)th scan signal, and a second electrode connected to the reference voltage node or the ground node.

In some example embodiments, the ramp waveform of the ramp voltage signal may have a slope, and a degree of the slope may vary based on the slope data voltage.

In some example embodiments, the ramp voltage generating circuit may have a driving period including an initialization period and a ramp period following the initialization period. During the initialization period, a voltage of the ramp voltage signal may be configured to decrease to a reference voltage. During the ramp period, the voltage of the ramp voltage signal may be configured to gradually increase higher than the reference voltage to have the ramp waveform.

In some example embodiments, during the ramp period, the voltage of the ramp voltage signal may be configured to increase gradually from the reference voltage.

In some example embodiments, the driving period may further include a hold period between the initialization period and the ramp period. During the hold period, the ramp voltage signal may be configured to be maintained at the reference voltage.

In some example embodiments, the driving period may further include a programming period between the initialization period and the ramp period. During the programming period, the voltage of the ramp voltage signal may be configured gradually increase from the reference voltage. During the ramp period, the voltage of the ramp voltage signal may be configured to continue gradually increasing following the gradual increase in the programming period.

In another aspect of the present disclosure, a display device may include: a display panel including a plurality of data lines, a plurality of gate lines, and a plurality of pixel circuits; a data driver configured to output a data voltage of pixel data to the pixel circuits respectively through the data lines; and a gate driver configured to output at least one gate signal including a square wave pulse and a ramp voltage signal including a ramp waveform to the pixel circuits respectively through the gate lines.

In some example embodiments, the at least one gate signal may include a scan signal and an emission signal. Each of the plurality of pixel circuits may include: a pixel driving transistor, a pixel switch transistor, and a light-emitting element connected in series between a pixel driving voltage and a cathode voltage; and a gate electrode of the pixel switch transistor is configured to receive the emission signal or the ramp voltage signal.

In some example embodiments, each of the plurality of pixel circuits may further include a compensation circuit configured to receive at least one of the scan signal, the emission signal, the ramp voltage signal, and the data voltage of pixel data, and connected to the pixel driving transistor and the pixel switch transistor.

In some example embodiments, each of the plurality of pixel circuits may include: a current generating circuit configured to receive a pixel driving voltage and output a constant current; a pulse width control circuit configured to receive the data voltage of pixel data and the ramp voltage signal and to output a pulse width modulation (PWM) signal; and a switch transistor configured to switch the current flowing through a light-emitting element in response to the PWM signal.

In some example embodiments, the gate driver may include: a gate signal generating circuit configured to sequentially output the at least one gate signal including the square wave pulse; and a ramp voltage generating circuit configured to receive the at least one gate signal and a slope data voltage and to output the ramp voltage signal based on the square wave pulse of the at least one gate signal and on the slope data voltage.

According to an embodiment of the present disclosure, it is possible to realize a display panel which is advantageous in terms of high efficiency, high luminance, and long service life.

According to an embodiment of the present disclosure, it is possible to output a gate signal of a ramp waveform from the gate driving circuit that supplies the gate signal to the pixel.

According to an embodiment of the present disclosure, it is possible to stabilize the gate signal having a ramp waveform by compensating for the threshold voltage of the transistor generating a current to produce a stable constant current in the gate driver.

According to an embodiment of the present disclosure, it is possible to adjust the luminance of a pixel by applying the gate signal of a ramp waveform to the pixel circuit.

According to an embodiment of the present disclosure, it is possible to improve image quality by improving grayscale representation for each grayscale and by improving the luminance and color sense of the pixels.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
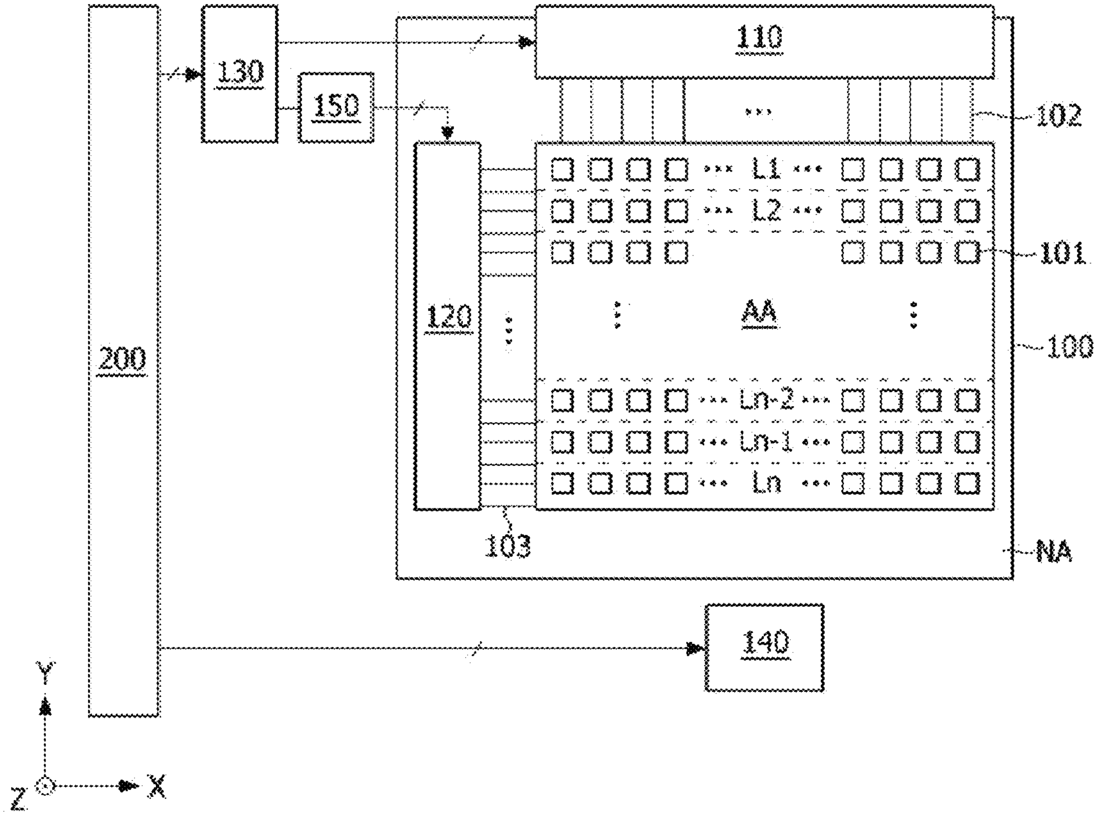
FIG. 1 is a block diagram illustrating a display device according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," "include," or "contain" is used, one or more other elements may be added unless the term is used with a more limiting term, such as "only." An element described in a singular form may include a plurality of elements, and vice versa, unless the context clearly indicates otherwise.

In construing an element, the element should be construed as including an ordinary error or tolerance range even where no explicit description of such an error or tolerance range is provided.

Where a positional relationship between two elements is described with such a term as "on," "above," "below," "next to," "connected with," "coupled with," "crossing," "intersecting," or the like, one or more other elements may be located between the two elements unless the term is used with a more limiting term, such as "immediate(ly)" or "direct(ly)."

Where a temporal relationship is described using such a term as "after," "following," "next to," "before," or the like, it may include a non-consecutive case unless it is used with a more limiting term like "immediately" or "directly."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

A pixel circuit and a gate drive circuit of a display device may include a plurality of transistors. The transistors may be implemented as thin film transistors (TFTs). The transistors may be implemented as an oxide thin film transistor (TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the present disclosure is not limited to a specific designation of a source and a drain of a transistor. In the following description, a source and a drain of a transistor may be interchangeably referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various example embodiments of the present disclosure will be described in detail with reference to the accompanying drawings.

Figure 2A:
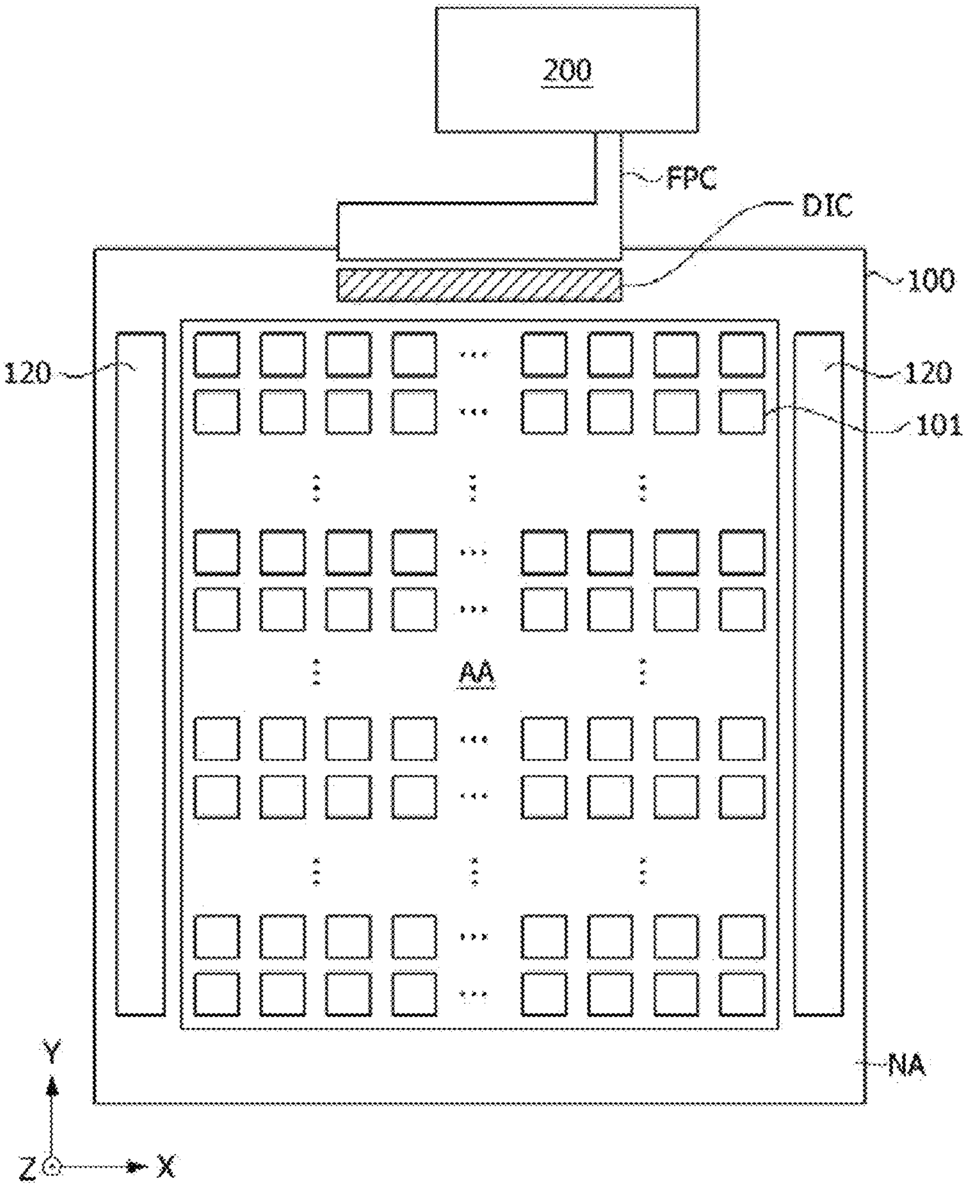
FIGS. 2A and 2B are diagrams illustrating other examples of the display device.
Figure 2B:
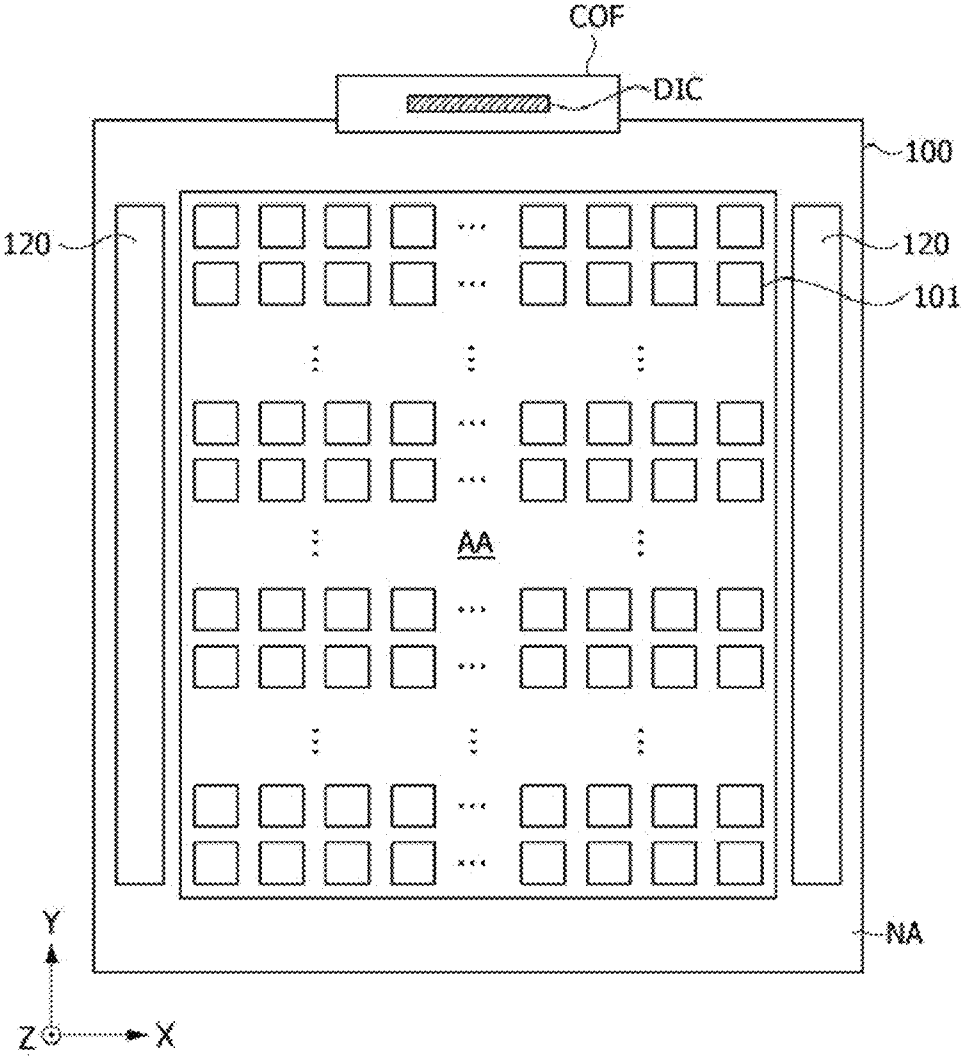

FIG. 1 is a block diagram illustrating a display device according to an example embodiment of the present disclosure. FIGS. 2A and 2B are diagrams illustrating other examples of the display device.

As shown in FIGS. 1 to 2B, a display device according to an example embodiment of the present disclosure may include a display panel 100, a display panel driving circuit for writing pixel data to pixels 101 of the display panel 100, and a power supply 140 for generating power necessary for driving the pixels 101 and the display panel driving circuit.

A substrate of the display panel 100 may be, but is not limited to, a plastic substrate, a thin glass substrate, or a metal substrate. The display panel 100 may be, but is not limited to, a rectangular shaped panel having a length in the X-axis direction (or the first direction), a width in the Y-axis direction (or the second direction), and a thickness in the Z-axis direction (or the third direction). For example, at least a portion of the display panel 100 may have a curved perimeter.

The display panel 100 may be implemented with a non-transmissive display panel or a transmissive display panel. The transmissive display panel may be applied to a transparent display device in which an image is displayed on a screen and an actual object in the background is visible. The display panel 100 may be a flexible display panel. Additionally, the display panel 100 may be a stretchable panel that may be stretched.

A display area AA of the display panel 100 may include a pixel array for displaying an input image thereon. The pixel array may include a plurality of data lines 102, a plurality of gate lines 103 intersecting the data lines 102, and the pixels 101 arranged in a matrix form. The display panel 100 may further include power lines commonly connected to the pixels 101. The power lines may be commonly connected to pixel circuits and may supply a constant voltage for driving the pixels 101 to the pixels. The power lines may be implemented as long stripes of wirings along either the first or second direction, or as mesh wirings where the wirings in the first direction and the wirings in the second direction are electrically connected. The power lines may further include a VGL line and a VGH line connected to the gate driver 120. A gate low voltage may be applied to the VGL line, and a gate high voltage may be applied to the VGH line.

Each of the pixels 101 may include a red sub-pixel, a green sub-pixel, and a blue sub-pixel for color implementation. Each of the pixels may further include a white sub-pixel. Each sub-pixel may include a pixel circuit for driving a light-emitting element. Each of the pixel circuits may be connected to the data lines, the gate lines, and the power lines. Hereinafter, a "pixel" may be understood as having the same meaning as a "sub-pixel."

The pixels may be arranged in the form of real color pixels and pentile pixels. A pentile pixel may realize a higher resolution than a real color pixel by driving two sub-pixels having different colors as one pixel 101 by using a preset pixel rendering algorithm. A pixel rendering algorithm may compensate for inadequate color representation in each pixel with the color of light emitted from its adjacent pixel.

The pixel array may include a plurality of pixel lines L1 to Ln. Each of the pixel lines L1 to Ln may include one line of pixels arranged along the line direction (X-axis direction) in the pixel array of the display panel 100. The pixels arranged in one pixel line may share one or more of the gate lines 103. The sub-pixels arranged in the column direction Y along the data line direction may share the same data line 102. One horizontal period is a time obtained by dividing one frame period by the total number of pixel lines L1 to Ln.

The power supply 140 may generate constant voltages (or direct current (DC) voltages) required for driving the pixel array and the display panel driving circuit of the display panel 100 by using a DC-DC converter. The DC-DC converter may include a charge pump, a regulator, a buck converter, a boost converter, and the like. The power supply 140 may adjust the level of the DC input voltage applied from a host system 200 to output a gamma reference voltage, a gate low voltage, a gate high voltage, a pixel driving voltage, a cathode voltage, and the like. The gamma reference voltage may be supplied to the data driver 110. A dynamic range of the data voltage output from the data driver 110 may be determined by a voltage range of the gamma reference voltage. The dynamic range of the data voltage may be the range of voltages between the uppermost grayscale voltage and the lowermost grayscale voltage.

The gate high voltage and the gate low voltage may be supplied to a level shifter 150 and the gate driver 120. The constant voltages, such as the pixel driving voltage and a cathode voltage, may be supplied to the pixels 101 through the power lines commonly connected to the pixels 101. The pixel driving voltage may be supplied from a main power source of the host system 200 to the display panel 100. In this case, the power supply 140 may not need to output the pixel driving voltage.

The display panel driving circuit may write the pixel data of the input image to the pixels of the display panel 100 under the control of the timing controller 130. The display panel driving circuit may include the data driver 110 and the gate driver 120.

The display panel driving circuit may further include a touch sensor driver for driving touch sensors. The touch sensor driver is not illustrated in FIG. 1 to FIG. 2B. The data driver 110 and the touch sensor driver may be integrated into a single drive integrated circuit (IC). In a mobile terminal or a wearable terminal, the timing controller 130, the power supply 140, the level shifter 150, the data driver 110, the touch sensor deriver, and the like may be integrated into one drive IC (DIC) as shown in FIGS. 2A and 2B.

The data driver 110 may receive the pixel data of the input image received as a digital signal from the timing controller 130 and output the data voltages. The data driver 110 may output the data voltages by converting the pixel data of the input image into a gamma compensation voltage using a digital-to-analog converter (DAC). The gamma reference voltage may be divided into the gamma compensation voltage for each grayscale by a voltage divider circuit in the data driver 110, which is supplied to the DAC. The DAC may generate the data voltages as the gamma compensation voltages corresponding to the grayscale values of the pixel data. The data voltages output from the DAC may be output from the respective data output channels of the data drive 110 to the data lines 102 through the output buffers.

The gate driver 120 may be formed on the display panel 100 together with the TFT array of the pixel array and the wirings. The gate driver 120 may be disposed in a non-display area NA of the display panel 100 outside the display area AA, or at least a portion thereof may be disposed in the display area AA.

The gate driver 120 may be disposed on either or both of a left non-display area NA and a right non-display area NA outside the display area AA in the display panel 100 to supply the gate signals to the gate lines 103 in a single feeding method. In the single feeding method, the gate signals may be applied to one end of the gate lines. The gate driver 120 may be disposed in both the left non-display area NA and the right non-display area NA of the display panel 100 to apply the gate signals to the gate lines 103 in a double feeding method. In the double feeding method, the gate signals are applied simultaneously at both ends of the gate lines 103. At least some circuits of the gate driver 120 may be disposed within the display area AA.

The gate driver 120 may include a gate signal generating circuit that generates pulses of gate signals, and a ramp voltage generating circuit that is connected to an output end of the gate signal generating circuit. The gate signal may include one or more of a scan signal, an emission signal, and a ramp switching signal.

The gate signal generating circuit may include a plurality of shift registers for sequentially shifting pulses of the gate signal. The ramp voltage generating circuit may receive at least one gate signal and slope control data. The slope control data may be generated from the timing controller 130 and be input to the ramp voltage generating circuit through the level shifter 150. The ramp voltage generating circuit may output a ramp voltage signal of a ramp waveform whose voltage varies with a slope determined by the voltage level of a slope data voltage. The gate signal output from the gate signal generating circuit and the ramp voltage signal output from the ramp voltage generating circuit may be supplied to the pixels. The ramp voltage signal may be interpreted as the gate signal of the ramp waveform.

The gate signal and the ramp voltage signal from the gate driver 120 may be supplied to the pixel circuit of the pixels 101 through the gate lines. For example, the scan signal and the ramp voltage signal may be applied to the pixel circuit, or the scan signal, the emission signal, and the ramp voltage signal may be applied to the pixel circuit.

The timing controller 130 may receive from the host system 200 the pixel data of the input image and a timing signal synchronized with the pixel data. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The data enable signal DE may have a cycle of one horizontal period (1H).

The timing controller 130 may control the data driver 110 and gate driver 120 of the display panel driving circuit by generating signals or timing information to control the operation timing of the data driver 110 and gate driver 120 of the display panel driving circuit based on the timing signals (e.g., Vsync, Hsync, and DE) received from the host system 200.

A gate timing control signal generated from the timing controller 130 may be input to the shift register of the gate driver 120 through the level shifter 150. The level shifter 150 may receive the gate timing control signal and generate a clock to provide it to the shift register of the gate driver 120. The input signal to the level shifter 150 may be a signal of a digital signal voltage level. The output signal of the level shifter 150 may include a clock of an analog voltage that swings between a gate high voltage and a gate low voltage. The data timing control signal generated from the timing controller 130 may be transmitted to the data driver 110.

The host system 200 may scale an image signal from a video source to match the resolution of the display panel 100 and may transmit the scaled image signal to the timing controller 130 together with the timing signal. In a mobile system, the host system 200 may be implemented with an application processor (AP). The host system 200 may transmit the pixel data of the input image to the drive IC (DIC) shown in FIGS. 2A and 2B through a mobile Industry Processor Interface (MIPI). The host system 200 may be electrically connected to the drive IC (DIC) through a flexible printed circuit, for example, a flexible printed circuit (FPC), as shown in FIG. 2A. The drive IC (DIC) may be attached on the display panel 100 during a chip on glass (COG) process. The drive IC (DIC) may be electrically connected to the wirings on the display panel 100 as a chip on film (COF) structure mounted on a flexible circuit film, as shown in FIG. 2B.

The timing controller 130 or the host system 200 may enter a low power mode to reduce power consumption of the display device when a still image or always on display (AOD) data is input. In a normal mode, the pixels 101 may have a refresh rate of 60 Hz, 144 Hz, 240 Hz, or the like. The refresh rate is the frequency at which pixel data is written to the pixels 101. In the low power mode, the refresh rate of the pixels 101 may be lowered to a frequency lower than 60 Hz, for example, 1 Hz to 30 Hz. When the refresh rate is 1 Hz, a first frame out of 60 frames per second may be a refresh frame, and the next 59 frames may be holding frames. After a data voltage Vdata of the pixel data is charged in the pixels 101 during a refresh frame period, the pixels 101 may maintain the data voltage charged during a previous refresh frame period without newly charging the data voltage Vdata during subsequent holding frame periods to maintain an emitting state.

Figure 3:
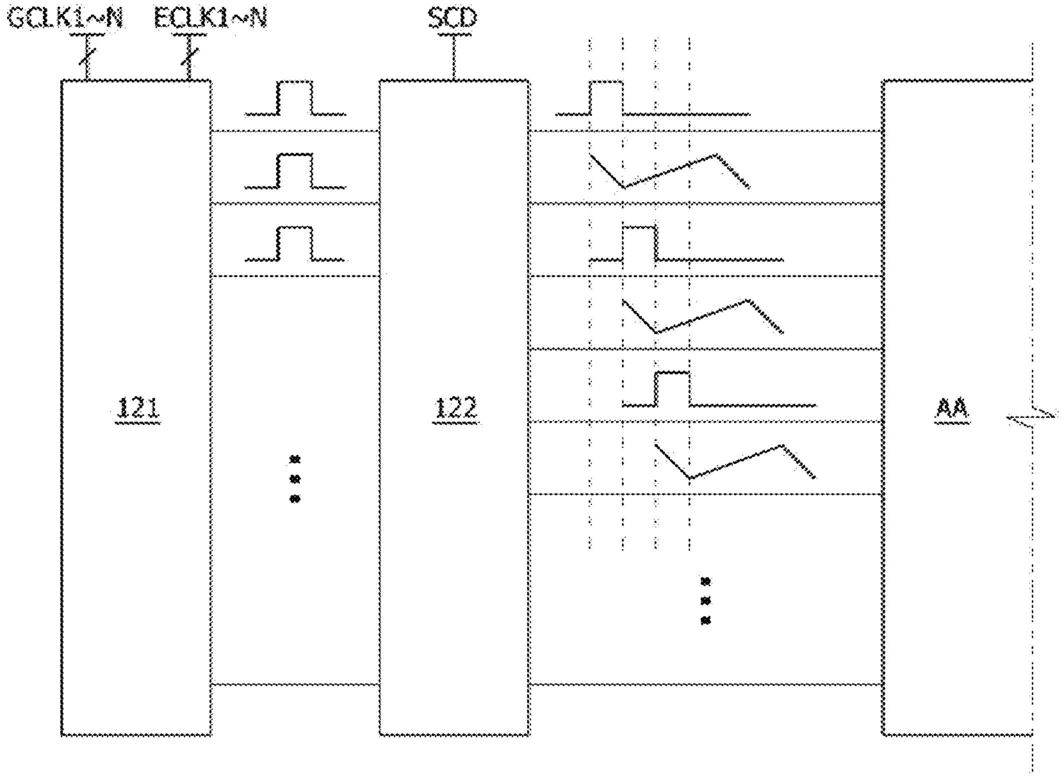
FIG. 3 is a block diagram illustrating a gate signal generating circuit and a ramp voltage generating circuit according to an example embodiment of the present disclosure.

FIG. 3 is a block diagram showing a gate signal generating circuit and a ramp voltage generating circuit according to an example embodiment of the present disclosure.

As illustrated in FIG. 3, the gate driver 120 may include a gate signal generating circuit 121 and a ramp voltage generating circuit 122.

The gate signal generating circuit 121 and the ramp voltage generating circuit 122 may be disposed on the display panel 100.

A shift register of the gate signal generating circuit 121 may receive clocks GCLK1 to GCLKN and ECLK1 to ECLKN from the level shifter and sequentially output a pulse of the gate signal at clock timing. The gate signal may include a scan signal, an emission signal, or a ramp switching signal. Each of the gate signals output from the gate signal generating circuit 121 may include a square wave pulse which may be applied to the pixel circuit through gate lines, and at least some of these gate signals may be applied to the ramp voltage generating circuit 122.

The pulse of the gate signal output from the gate signal generating circuit 121 may be output in synchronization with clocks GCLK1 to GCLKN and ECLK1 to ECLKN. The clocks GCLK1 to GCLKN and ECLK1 to ECLKN may control the rising time, pulse width duration, and falling time of the gate signal pulse. Each of first clocks GCLK1 to GCLKN may be a clock input to a first shift register that outputs a pulse of the scan signal. Each of second clocks ECLK1 to ECLKN may be a clock input to a second shift register that outputs a pulse of the emission signal or the ramp switching signal. The clocks GCLK1 to GCLKN and ECLK1 to ECLKN may be N-phase clocks (where N is a natural number greater than or equal to 2). The emission signal and the ramp switching signal may be output from separate shift registers.

The ramp voltage generating circuit 122 may be disposed between the gate signal generating circuit 121 and the pixel lines L1 to Ln. A plurality of ramp voltage generating circuits 122, each connected to a pixel line, may be disposed on the display panel 100. The ramp voltage generating circuit 122 may be connected one for each of the pixel lines L1 to Ln but is not limited thereto.

The ramp voltage generating circuit 122 may receive a pulse of the gate signal input from the gate signal generating circuit 121. In addition, the ramp voltage generating circuit 122 may receive a slope data voltage SCD. The slope data voltage SCD may be output from the data driver 110 or may be output from the power supply 140. The slope data voltage SCD may be generated as the same data value during one frame period. Therefore, the slope data voltage SCD may be input in common to all of the ramp voltage generating circuits 122 formed on the display panel 100 through a single wiring formed on the display panel 100.

The digital data corresponding to the slope data voltage SCD may be adjusted by the timing controller 130 or the host system 200. The data driver 110 or the power supply 140 may convert the digital data corresponding to the slope data voltage SCD into a voltage and output the converted slope data voltage SCD. Therefore, the timing controller 130 or the host system 200 may change the slope of the ramp voltage signal Vramp by changing the voltage level of the slope data voltage SCD.

Figure 4:
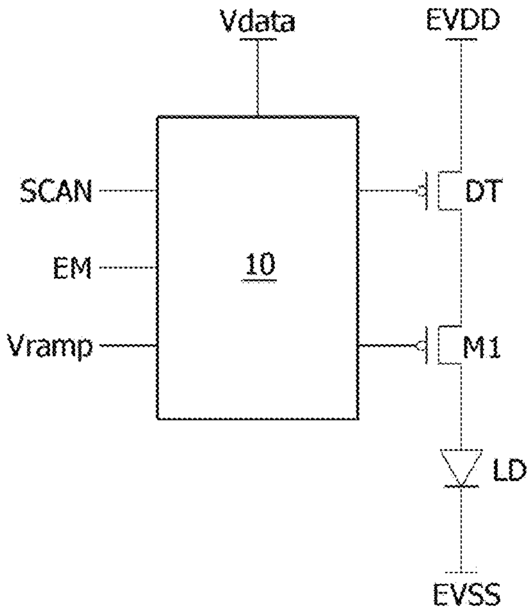
FIGS. 4 and 5 are diagrams illustrating examples of a pixel circuit applicable to the present disclosure.
Figure 5:
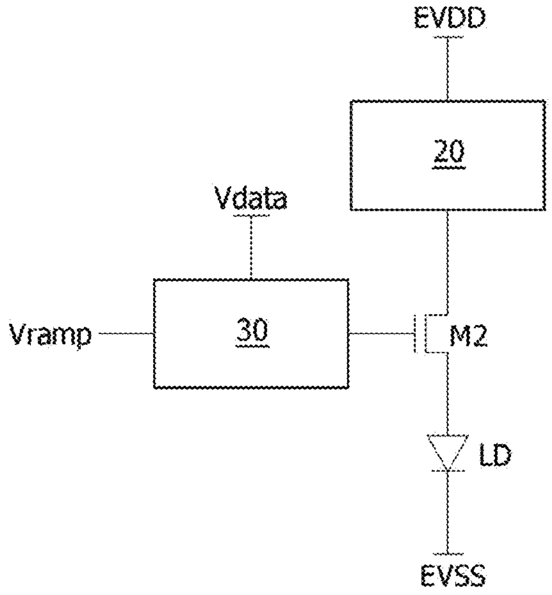

The ramp voltage generating circuit 122 may output a ramp voltage signal Vramp whose voltage changes gradually on a time axis. As shown in FIGS. 4 and 5, the ramp voltage signal Vramp may be applied to the pixel circuit along with the pulse of the gate signal.

FIGS. 4 and 5 are examples of the pixel circuit applicable to the present disclosure. In FIGS. 4 and 5, an example in which a driving device DT and the switch devices M1 and M2 are implemented as p-channel transistors is illustrated, but the present disclosure is not limited thereto.

As shown in FIG. 4, the pixel circuit may include a light-emitting element LD, a driving element DT, a switch element M1, and a compensation circuit 10.

The light-emitting device LD may be implemented as an organic light-emitting diode (hereinafter referred to as "OLED"), which includes an anode electrode and a cathode electrode, or as an inorganic light-emitting element such as a micro-LED. The light-emitting element LD may be driven by a current from the driving element DT to emit light.

The OLED may include an anode electrode, a cathode electrode, and an organic compound layer interposed between these electrodes. The organic compound layer may include, but is not limited to, a hole injection layer (HIL), a hole transport layer (HTL), a light-emitting layer (EML), an electron transport layer (ETL), and an electron injection layer (EIL). When a voltage is applied to the anode and cathode electrodes of the light-emitting element LD, holes passing through the hole transport layer (HTL) and electrons passing through the electron transport layer (ETL) move to the light-emitting layer (EML) to form excitons. In this case, visible light is emitted from the light-emitting layer EML. The OLED may be implemented as an OLED having a tandem structure in which a plurality of light-emitting layers are stacked. The OLED having the tandem structure may improve the luminance and lifespan of the pixels.

Inorganic light-emitting elements may be implemented as a micro-LED chip having a vertical structure in which electrodes are disposed above and below the chip with the light-emitting elements integrated therein, or a lateral structure or a flip-chip structure.

The driving element DT, the light-emitting element LD, and the switch element M1 may be connected in series between a pixel driving voltage EVDD and a cathode voltage EVSS. In FIG. 4, the light-emitting device LD is connected between the switch device M1 and the cathode voltage EVSS, but the present disclosure is not limited thereto. For example, the light-emitting element LD may be connected between the pixel driving voltage EVDD and the driving element DT.

The driving element DT may regulate the current flowing through a drain-to-source channel based on a gate-to-source voltage. The gate-to-source voltage of the driving element DT may vary with the data voltage Vdata of the pixel data applied to a gate electrode of the driving element DT. A storage capacitor, not shown in drawings, may be connected between the gate electrode and a source electrode of the driving element DT.

The switch element M1 may switch a current path between the pixel driving voltage EVDD and the cathode voltage EVSS. The switch element M1 may turn on in response to an emission signal EM or a ramp voltage signal Vramp applied to its gate electrode. When the switch element M1 is turned on, the driving element DT and the light-emitting element LD may be electrically connected so that a current can be supplied to the light-emitting element LD. When the first switch element M1 is turned off, the current path between the pixel driving voltage EVDD and the cathode voltage EVSS is blocked so that no current is supplied to the light-emitting element LD.

The compensation circuit 10 may receive one or more scan signals SCAN, the emission signal EM, the ramp voltage signal Vramp, and the data voltage Vdata of the pixel data, and the compensation circuit 10 may be connected to the driving element DT and the switch element M1. The compensation circuit 10 may initialize main nodes of the pixel circuit and a storage capacitor in response to a pulse of the scan signal SCAN. The compensation circuit 10 may apply the data voltage Vdata to the storage capacitor and the gate electrode of the driving element DT, sample a threshold voltage of the driving element DT, and compensate for the gate-to-source voltage of the driving element DT by the threshold voltage. This compensation circuit 10 may compensate for the threshold voltage deviation of the driving element DT using a source follower or a diode connection circuit.

As illustrated in FIG. 5, the pixel circuit may include a light-emitting element LD, a switch element M2, a current generating circuit 20, and a pulse width control circuit (hereinafter referred to as a "PWM control circuit") 30. An example in which the switch element M2 is implemented as a n-channel transistor is shown in FIG. 5, but the present disclosure is not limited thereto.

The current generating circuit 20, the switch element M2, and the light-emitting element LD may be connected in series between a pixel driving voltage EVDD and a cathode voltage EVSS. In FIG. 5, the light-emitting device LD is connected between the switch device M2 and the cathode voltage EVSS, but the present disclosure is not limited thereto. For example, the light-emitting element LD may be connected between the pixel driving voltage EVDD and the driving element DT.

The switch element M2 may switch a current path between the pixel driving voltage EVDD and the cathode voltage EVSS. The switch element M2 may turn on in response to a PWM signal from the PWM control circuit 30 to adjust the emission time of the light-emitting element LD.

In the case of inorganic LEDs, color shift may occur at low currents, resulting in chromatic distortion. To prevent such color shift, the current generating circuit 20 may supply a constant current having a high luminous efficiency to the light-emitting element LD. The PWM control circuit 30 may switch the constant current supplied to the light-emitting element LD under pulse width modulation (PWM) control to cause the light-emitting element LD to emit light at a target luminance corresponding to a grayscale of the pixel data.

The current generating circuit 20 may generate a constant current with a high luminous efficiency of the light-emitting element LD. The current generating circuit 20 may include a driving element, i.e., a transistor that generates a current according to a gate-to-source voltage. In this case, the current generating circuit 20 may include a compensation circuit that samples and compensates for a threshold voltage of the transistor.

The PWM control circuit 30 may receive the data voltage Vdata of the pixel data and the ramp voltage signal Vramp and generate a PWM signal based on the result of comparing the data voltage Vdata and the ramp voltage signal Vramp.

Figure 6A:
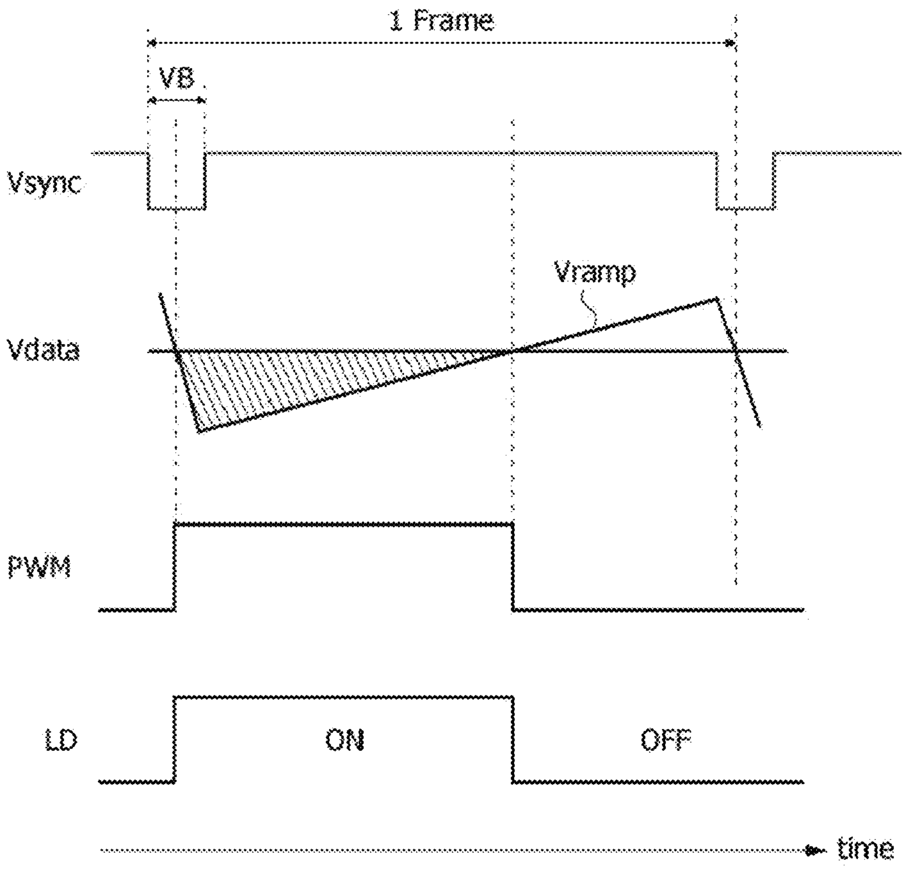
FIGS. 6A and 6B are waveforms illustrating the operation of the example pixel circuit shown in FIG. 5.
Figure 6B:
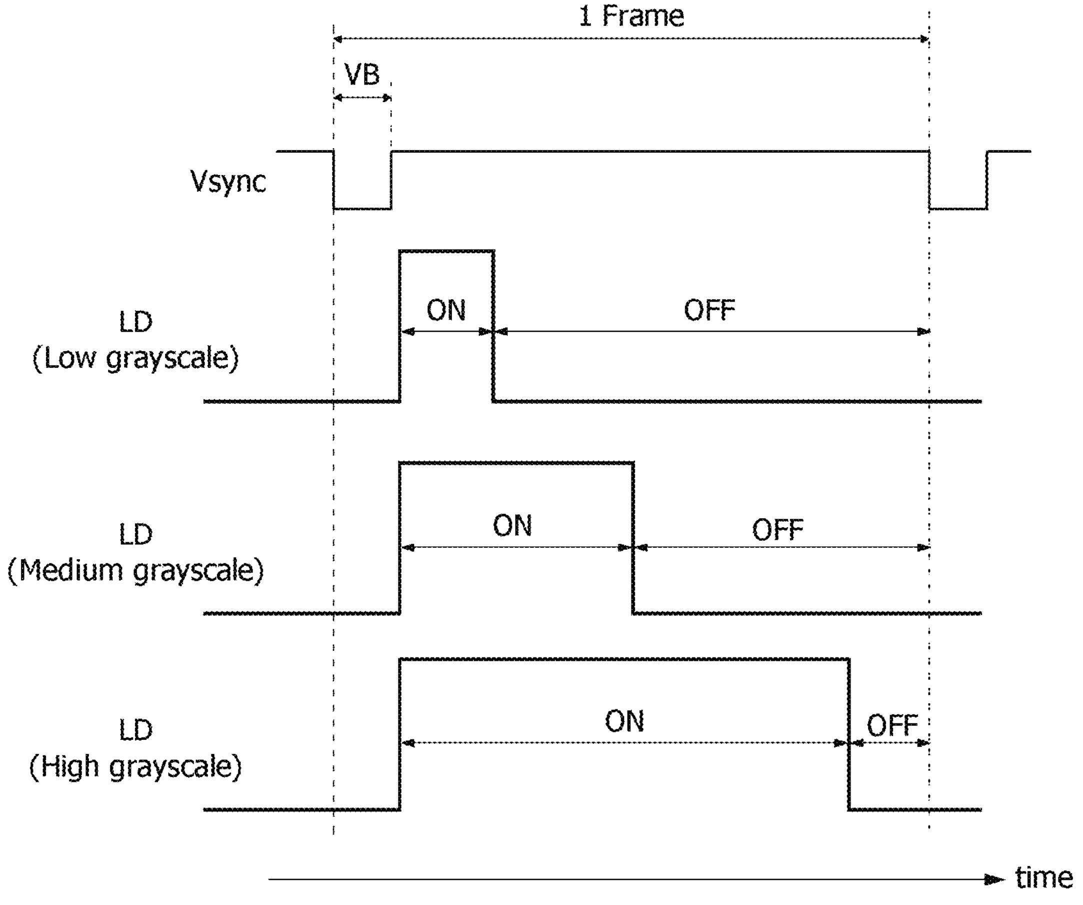

As shown in FIGS. 6A and 6B, the PWM signal may be generated with a high voltage during a section in which the data voltage Vdata is greater than the ramp voltage signal Vramp, but the present disclosure is not limited thereto. In this example, when the data voltage Vdata is lowered, the pulse width of the PWM signal becomes smaller, which shortens the light emission time of the light-emitting element LD, resulting in the luminance of the corresponding sub-pixel being lowered. On the other hand, when the data voltage Vdata is increased, the pulse width of the PWM signal becomes larger, which increases the emission time of the light-emitting element LD, increasing the luminance of the corresponding sub-pixel. The pulse width of the PWM signal may be small when the pixel data is data with a low grayscale value, and the pulse width of the PWM signal may become larger as the grayscale value increases to a medium grayscale and a high grayscale. As a result, the light-emitting device LD may have a longer lighting time (ON) proportional to the grayscale value, as shown in FIG. 6B.

In FIGS. 6A and 6B, "Vsync" is a vertical synchronization signal that occurs every 1 frame period. 'VB' is the vertical blank period during which no pixel data is written to the pixels. In FIG. 6A, a hatched portion indicates an interval in which the data voltage Vdata is greater than the ramp voltage signal Vramp. An ON period during which the light-emitting element LD emits light is substantially the same as the pulse period of the PWM signal. An OFF period during which the light-emitting device LD is turned off is substantially equal to an interval during which the data voltage Vdata is lower than the ramp voltage signal Vramp.

Figure 7:
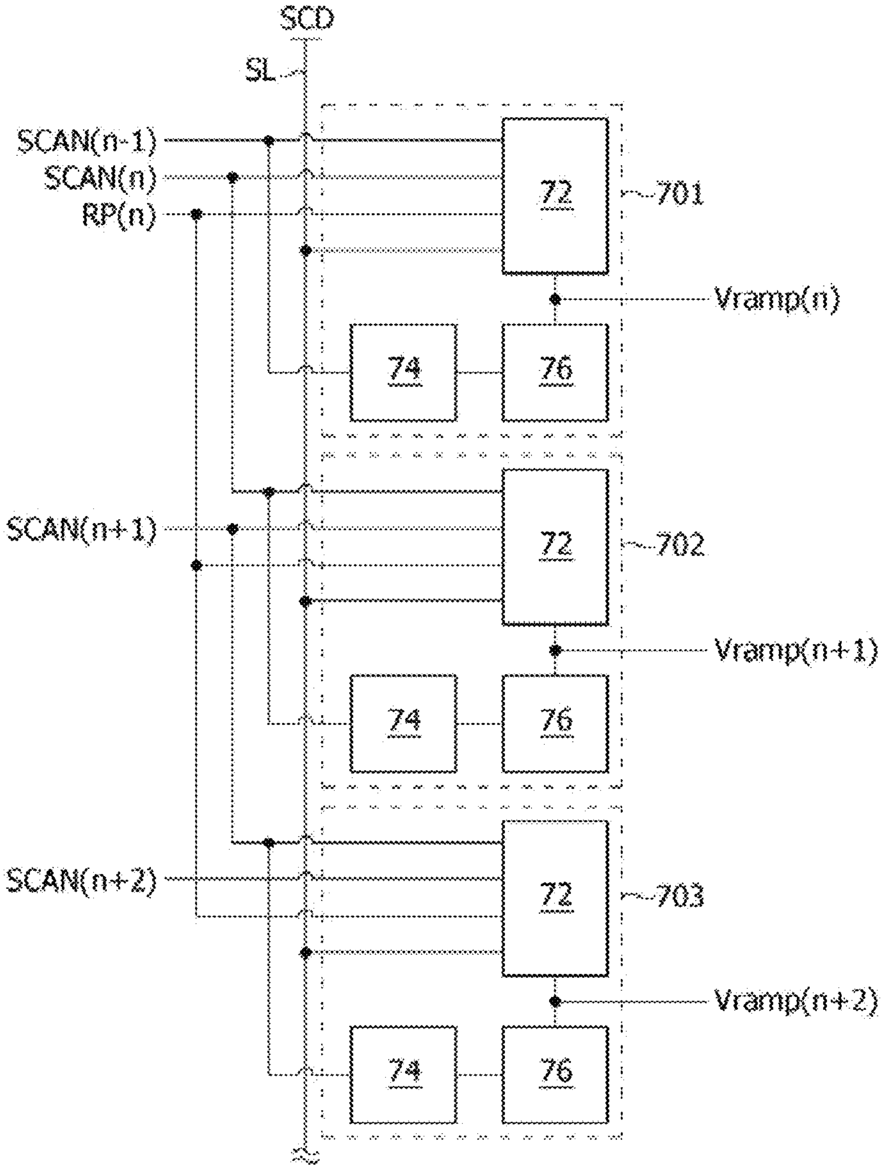
FIG. 7 is a circuit diagram illustrating a ramp voltage generating circuit according to an example embodiment of the present disclosure.
Figure 8:
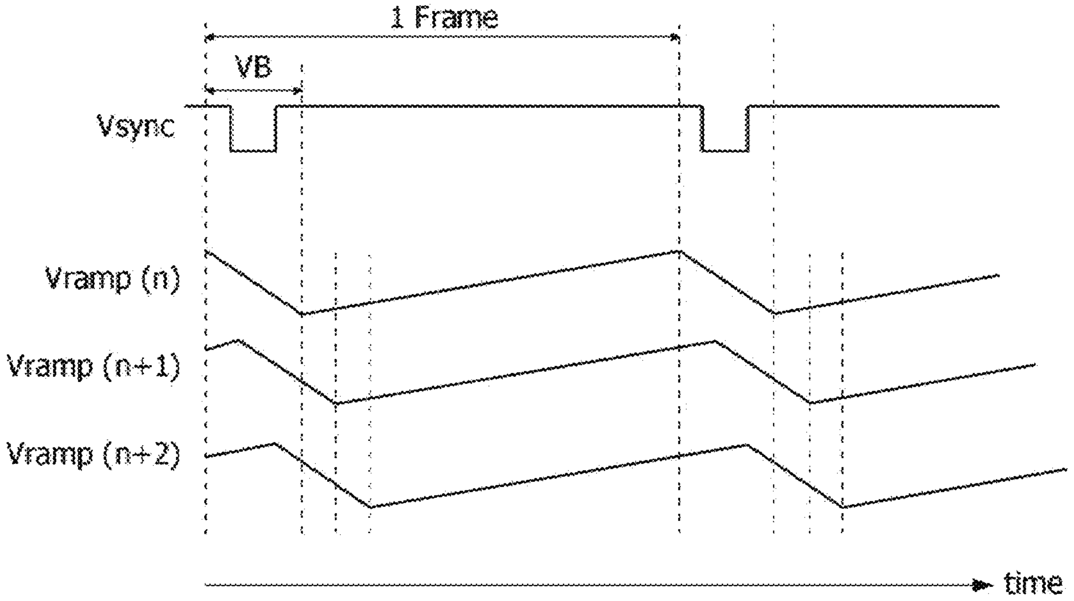
FIG. 8 is a waveform diagram illustrating one example of a ramp voltage signal that is sequentially output from the example ramp voltage generating circuit shown in FIG. 7.

FIG. 7 is a circuit diagram illustrating a ramp voltage generating circuit according to an example embodiment of the present disclosure. FIG. 8 is a waveform diagram illustrating one example of a ramp voltage waveform that is sequentially output from the ramp voltage generating circuit shown in FIG. 7.

As shown in FIGS. 7 and 8, the gate driver 120 may include a plurality of ramp voltage generating circuits 701 to 703. The ramp voltage generating circuits 701 to 703 may be disposed on the display panel 100.

The ramp voltage generating circuits 701 to 703 may receive gate signals, for example, scan signals SCAN(n−1) to SCAN(n+2) and a ramp switching signal RP(n), which are shifted in sequence. The ramp voltage generating circuits 701 to 703 may be connected in common to a slope data line SL to receive the slope data voltage SCD.

In FIG. 7, two scan signals and a ramp switching signal are shown, for example, to be input to the ramp voltage generating circuits 701 to 703, but present disclosure is not limited to. For example, one scan signal of the gate signals may be input to the ramp voltage generating circuits 701 to 703. The ramp switching signal RP(n) may be commonly input to two or more ramp voltage generating circuits 701 to 703, but the present disclosure is not limited to. A separate ramp switching signal RP(n) may be input independently to each of the ramp voltage generating circuits 701 to 703.

Each of the ramp voltage generating circuits 701 to 703 may include a current generating circuit 72, a ramp waveform control circuit 74, and a charging circuit 76. The current generating circuit 72 may receive one or more of the gate signals SCAN(n−1) to SCAN(n+2) and RP(n) to generate a current. The ramp waveform control circuit 74 may control the waveform of the ramp voltage signal by initializing the charging circuit 76 and adjusting the amount of electric charge charged to the charging circuit 76. The charging circuit 76 may charge the electric charge from the current generating circuit 72.

The nth ramp voltage generating circuit 701 (where n is a natural number) may receive the (n−1)th scan signal SCAN(n−1), the nth scan signal SCAN(n), and the ramp switching signal RP(n) and may output the nth ramp voltage signal Vramp(n). The (n+1)th ramp voltage generating circuit 702 may receive the nth scan signal SCAN(n), the (n+1)th scan signal SCAN(n+1), and the ramp switching signal RP(n), and may output the (n+1)th ramp voltage signal Vramp(n+1). The (n+2)th ramp voltage generating circuit 703 may receive the (n+1)th scan signal SCAN(n+1), the (n+2)th scan signal SCAN(n+2), and the ramp switching signal RP(n), and may output the (n+2)th ramp voltage signal Vramp(n+2). When a pulse of the scan signals SCAN (n−1) to SCAN(n+2) is sequentially input to the ramp voltage generating circuits 701 to 703 in a unit of one horizontal period (1H), the nth to (n+2)th ramp voltage signals Vramp(n) to Vramp(n+2) may be sequentially delayed by one horizontal period, as illustrated in FIG. 8.

Figure 9:
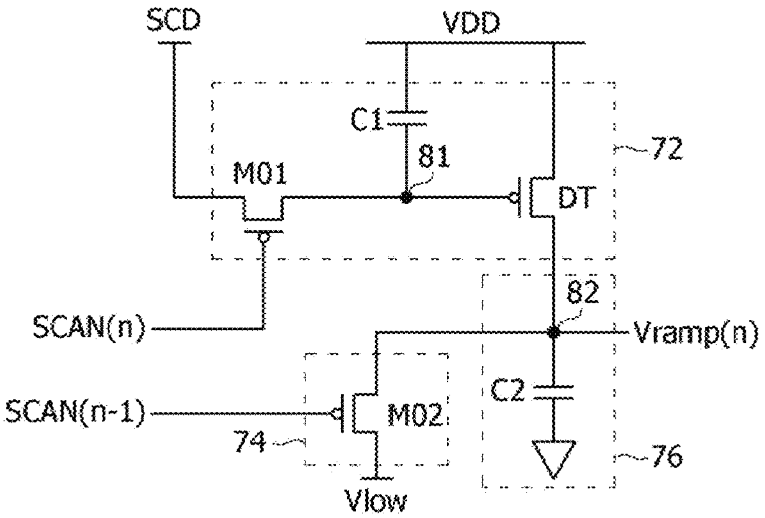
FIG. 9 is a circuit diagram illustrating a ramp voltage generating circuit according to a first example embodiment of the present disclosure.

FIG. 9 is a circuit diagram illustrating a ramp voltage generating circuit according to a first example embodiment of the present disclosure. The ramp voltage generating circuit shown in FIG. 9 is an example of the nth ramp voltage generating circuit 701. FIGS. 10A to 12B are diagrams illustrating the operation of the example ramp voltage generating circuit shown in FIG. 9.

As shown in FIG. 9, the ramp voltage generating circuit may receive a driving voltage VDD, a low potential reference voltage (hereinafter referred to as "reference voltage") Vlow, an (n−1)th scan signal SCAN(n−1), an nth scan signal SCAN(n), a ramp switching signal RP(n), and a slope data voltage SCD, and may output a ramp voltage signal Vramp (n).

The driving voltage VDD may be a constant voltage higher than the reference voltage. The slope data voltage SCD may have a voltage that corresponds to the slope of the ramp voltage signal Vramp. The slope data voltage SCD may be selected from a voltage range between a maximum voltage and a minimum voltage. The maximum voltage of the slope data voltage SCD may be lower than the driving voltage VDD. The driving voltage VDD may be a constant voltage selected from 5 V to 15 V, and the reference voltage Vlow may be a constant voltage selected from −5 V to 5 V but are not limited thereto. The slope data voltage SCD may be selected from, but is not limited to, a voltage between 0 and 10 V.

As can be seen from Q=C×V=i×t, the ramp voltage signal Vramp may increase linearly with an increase in current (i) and time (t). In Q=C×V, Q denotes the electric charge being charged into the capacitor, C denotes the capacitance of the capacitor, and V denotes the voltage. The minimum voltage of the ramp voltage signal Vramp(n) may be a voltage between-5 V and 5 V, and the maximum voltage may be controlled by a voltage between 5 V and 10 V, but the present disclosure is not limited thereto.

Transistors constituting the ramp voltage generating circuit shown, for example, in FIG. 9 are p-channel transistors. Hereinafter, the gate low voltage VGL and the gate high voltage VGH will be referred to as a gate-on voltage and a gate-off voltage, respectively. The gate signals SCAN(n−1), SCAN(n), and RP(n) may swing between the gate-off voltage VGH and the gate-on voltage VGL. The gate-off voltage VGH may be a voltage selected from 5 V to 15 V, and the gate-on voltage VGL may be a voltage selected between-10 V and 5 V, but present disclosure is not limited thereto.

The current generating circuit 72 may include a first switch element M01, a first capacitor C1, and a driving element DT. The ramp waveform control circuit 74 may include a second switch element M02. The charging circuit 76 includes a second capacitor C2. The switch elements M01, M02 and the driving element DT may be implemented as p-channel transistors but are not limited thereto. Each of the switch elements M01 and M02 may be turned on in response to the gate-on voltage VGL and be turned off in response to the gate-off voltage VGH.

A current may be generated from the current generating circuit 72 to charge the second capacitor C2. The ramp voltage signal Vramp may increase more slowly as the value of C, that is, the capacitance of the second capacitor C2, increases according to V=(i×t)/C. The smaller the capacitance of the second capacitor C2, the greater the slope of the ramp voltage signal Vramp, while the larger the capacitance of the second capacitor C2, the smaller the slope of the ramp voltage signal Vramp.

The first switch element M01 may be connected between a slope data line SL (see, e.g., FIG. 7), to which the slope data voltage SCD is applied, and the first node 81. The first switch element M01 may be turned on in response to the gate-on voltage VGL of the nth scan signal SCAN(n). When the first switch element M01 is turned on, the slope data line SL is electrically connected to the first node 81. The first switch element M01 may include a first electrode connected to the slope data line SL to which the slope data voltage SCD is applied, a gate electrode to which the nth scan signal SCAN(N) is applied, and a second electrode connected to the first node 81.

The driving element DT may be connected between a VDD node, to which the driving voltage VDD is applied, and the second node 82 to generate a current according to the gate-source voltage. The first capacitor C1 may charge the gate-source voltage Vgs of the driving element DT. The driving element DT may include a first electrode connected to the VDD node to which the driving voltage VDD is applied, a gate electrode connected to the first node 81, and a second electrode connected to the second node 82. The first capacitor C1 may be connected between the VDD node and the first node 81.

The second switch element M02 may be connected between the second node 82 and a reference voltage node, to which the reference voltage Vlow is applied, and may turn on in response to the gate-on voltage VGL of the (n−1)th scan signal SCAN(n−1). The voltage at the second node 82 may be equal to the ramp voltage signal Vramp(n). The second node 82 may be connected to the pixel circuit of the pixels 101 through gate lines. When the second switch element M02 is turned on, the reference voltage node is electrically connected to the second node 82 so that the reference voltage Vlow may be applied to the second node 82. The second switch element M02 may include a first electrode connected to the second node 82, a gate electrode to which the (n−1)th scan signal SCAN(n−1) is applied, and a second electrode connected to the reference voltage node to which the reference voltage Vlow is applied or to a ground node GND. Although FIG. 9 illustrates an example in which the second electrode of the second switch element M02 is connected to the reference voltage (Vlow) node, the second capacitor C2 together with the second electrode of the second switch element M02 may be commonly connected to the ground node GND.

The second capacitor C2 may be connected between the second node 82 and the ground node GND, or between the second node 82 and the reference voltage (Vlow) node. Although FIG. 9 illustrates an example in which the second capacitor C2 is connected to the ground node GND, the second capacitor C2 may be commonly connected to the reference voltage (Vlow) node with the second switch element M02.

The driving period of the ramp voltage generating circuit may be divided into an initialization period Ti, a programming period Tp, and a ramp period Tramp, as shown in FIGS. 10A to 12B.

Figure 10A:
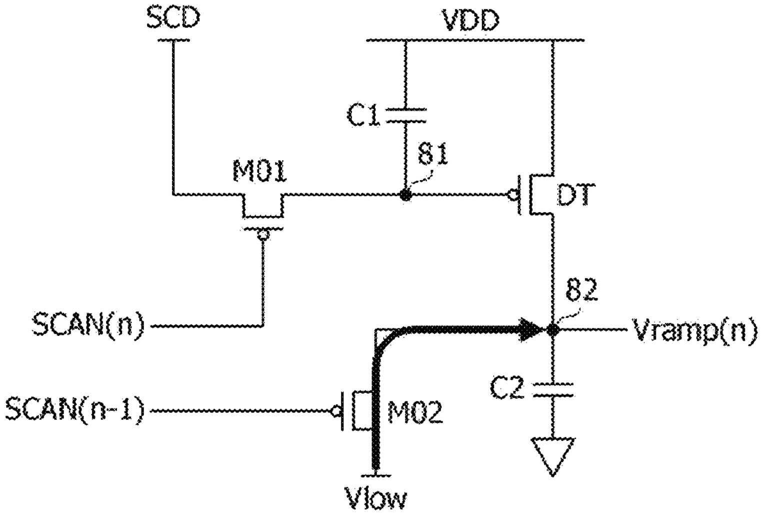
FIGS. 10A to 12B are diagrams illustrating the operation of the example ramp voltage generating circuit shown in FIG. 9.
Figure 10B:
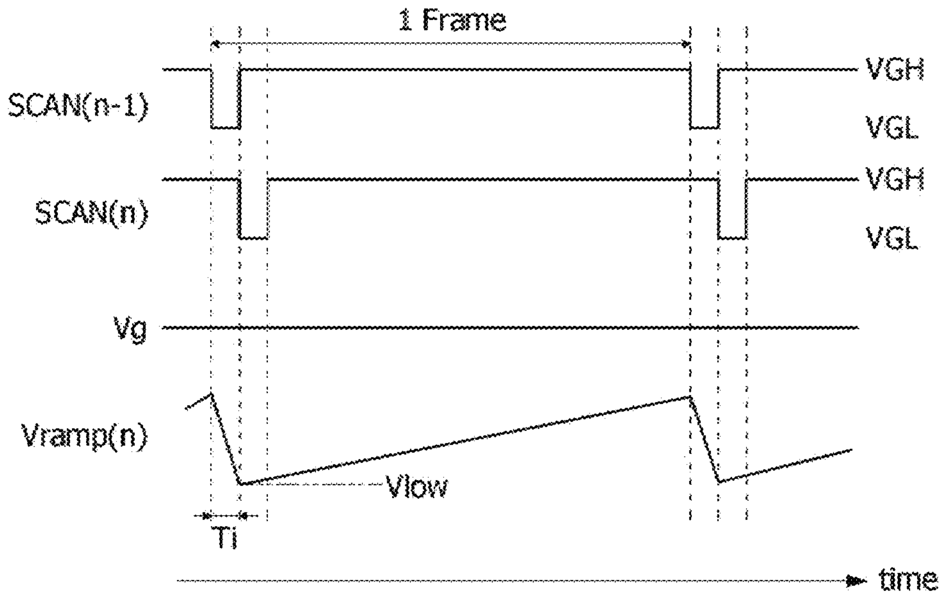

As shown in FIGS. 10A and 10B, during the initialization period Ti, the voltage of the (n−1)th scan signal SCAN(n−1) is at the gate-on voltage VGL, and the voltage of the nth scan signal SCAN(n) is at the gate-off voltage VGH. Thus, during the initialization period Ti, the second switch element M02 is turned on, while the first switch element M01 is turned off.

During the initialization period Ti, the first node 81 may be floating and be at a slope data voltage SCD that has been previously charged. Since the reference voltage Vlow is applied to the second node 82 during the initialization period Ti, the second capacitor C2 is initialized to the reference voltage Vlow. During the initialization period Ti, a current may be generated from the driving element DT, but this current may be discharged to the reference voltage (Vlow) node via the second switch element M02 at the "on" state and may not charge the second capacitor C2.

Figure 11A:
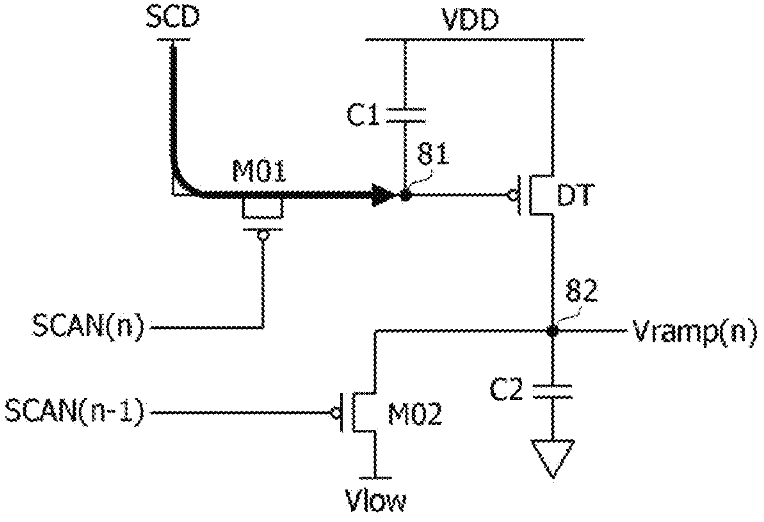
Figure 11B:
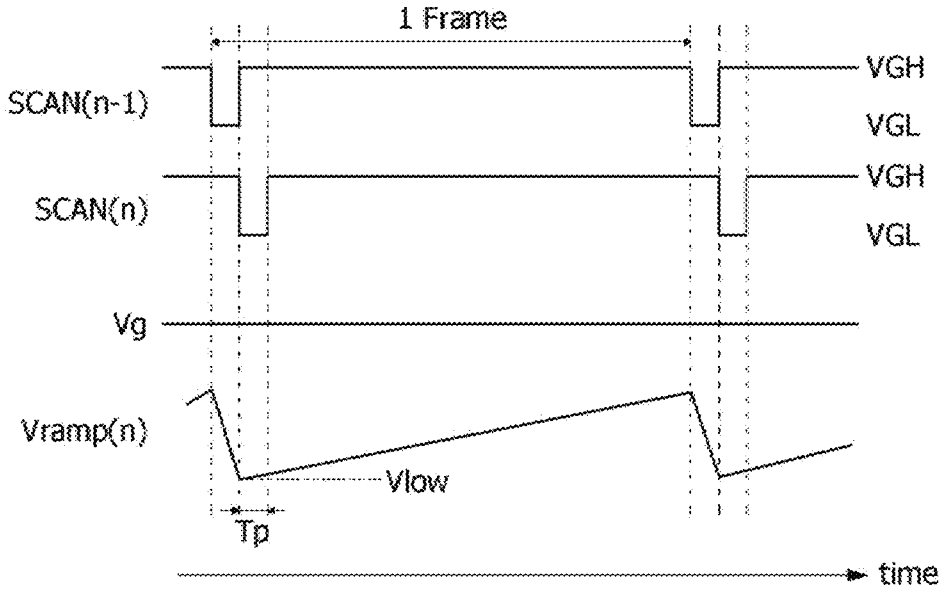

As shown in FIGS. 11A and 11B, during the programming period Tp, a voltage of the (n−1)th scan signal SCAN(n−1) is at the gate-off voltage VGH, and a voltage of the nth scan signal SCAN(n) is at the gate-on voltage VGL. Accordingly, during the programming period Tp, the first switch element M01 is turned on, while the second switch element M02 is turned off.

During the programming period Tp, the slope data voltage SCD may be applied to the first node 81. During the programming period Tp, the driving element DT may generate a constant current according to the gate-to-source voltage charged in the first capacitor C1. During the programming period Tp, the second capacitor C2 may begin to be charged by the constant current from the driving element DT, causing the voltage of the second node 82, i.e., the voltage of the ramp voltage signal Vramp(n), to increase.

Figure 12A:
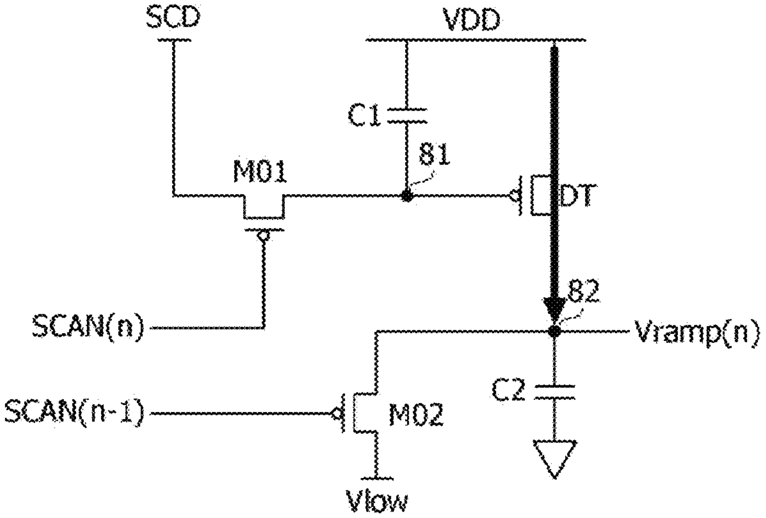
Figure 12B:
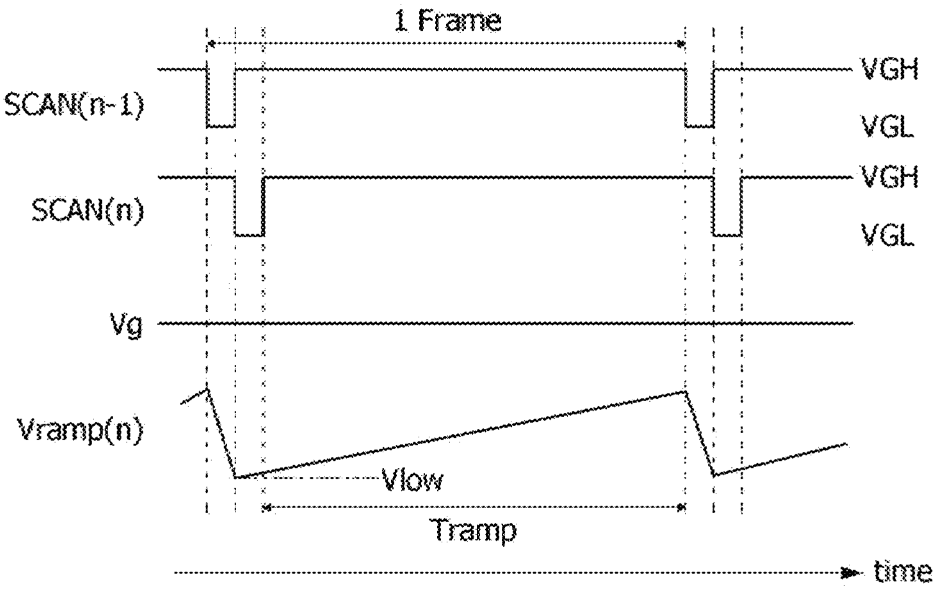

As shown in FIGS. 12A and 12B, the voltages of the (n−1) and nth scan signals SCAN(n−1) and SCAN(n) during the ramp period Tramp are at the gate-off voltage VGH. Therefore, during the ramp period Tramp, the first and second switch elements M01 and M02 are in the off state.

During the ramp period Tramp, the second capacitor C2 may be charged by the constant current from the driving element DT, and thus the voltage of the second node 82 may increase. Therefore, the voltage of the ramp voltage signal Vramp(n) applied to the pixel circuit may linearly increase over time during the ramp period Tramp.

Figure 13:
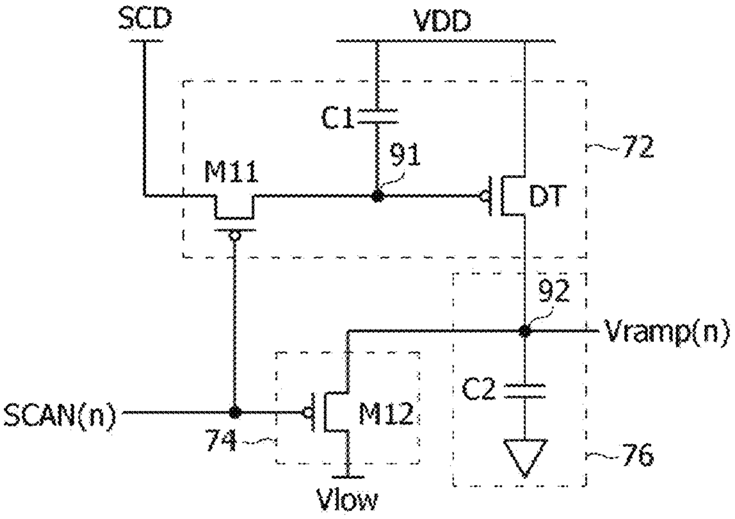
FIG. 13 is a circuit diagram illustrating a ramp voltage generating circuit according to a second example embodiment of the present disclosure.

FIG. 13 is a circuit diagram illustrating a ramp voltage generating circuit according to a second example embodiment of the present disclosure. The ramp voltage generating circuit shown in FIG. 13 is an example of the nth ramp voltage generating circuit 701. FIGS. 14A to 15B are diagrams illustrating the operation of the example ramp voltage generating circuit shown in FIG. 13. In these example embodiments, a detailed description of components substantially the same as those of the first example embodiment described above may be omitted.

As shown in FIG. 13, the current generating circuit 72 may include a first switch element M11, a first capacitor C1, and a driving element DT. The ramp waveform control circuit 74 may include a second switch element M12. The charging circuit 76 may include a second capacitor C2. The switch elements M11, M02 and the driving element DT may be implemented as p-channel transistors but are not limited thereto.

The first and second switch elements M11 and M12 may turn on/off simultaneously in response to one scan signal, SCAN(n) in this example.

The first switch element M11 may be connected between the slope data line SL (see, e.g., FIG. 7), to which the slope data voltage SCD is applied, and a first node 91. The first switch element M11 may turn on in response to the gate-on voltage VGL of the nth scan signal SCAN(n). When the first switch element M11 is turned on, the slope data line SL may be electrically connected to the first node 91. The first switch element M11 may include a first electrode connected to the slope data line SL to which the slope data voltage SCD is applied, a gate electrode to which the nth scan signal SCAN(n) is applied, and a second electrode connected to the first node 91.

The driving element DT may be connected between a VDD node, to which the driving voltage VDD is applied, and a second node 92 to generate a current according to the gate-source voltage. The driving element DT may include a first electrode connected to the VDD node to which the driving voltage VDD is applied, a gate electrode connected to the first node 91, and a second electrode connected to the second node 92. The first capacitor C1 may be connected between the VDD node and the first node 91.

The second switch element M12 may be connected between the second node 92 to which the ramp voltage signal Vramp(n) is output and the reference voltage node to which the reference voltage Vlow is applied, and may turn on in response to the gate-on voltage VGL of the nth scan signal SCAN(n). When the second switch element M12 is turned on, the reference voltage (Vlow) node may be electrically connected to the second node 92 so that the reference voltage Vlow is applied to the second node 92. The second switch element M12 may include a first electrode connected to the second node 92, a gate electrode to which the (n)th scan signal SCAN(n) is applied, and a second electrode connected to the reference voltage node to which the reference voltage Vlow is applied or a ground node GND. Although FIG. 13 illustrates an example in which the second electrode of the second switch element M12 is connected to the reference voltage (Vlow) node, the second capacitor C2 together with the second electrode of the second switch element M12 may be commonly connected to the ground node GND.

The second capacitor C2 may be connected between the second node 92 and the ground node GND, or between the second node 92 and the reference voltage (Vlow) node. Although FIG. 13 illustrates an example in which the second capacitor C2 is connected to the ground node GND, the second capacitor C2 may be commonly connected to the reference voltage (Vlow) node with the second switch element M12.

The driving period of the ramp voltage generating circuit may be divided into an initialization period Ti and a ramp period Tramp, as shown in FIGS. 14A to 15B.

Figure 14A:
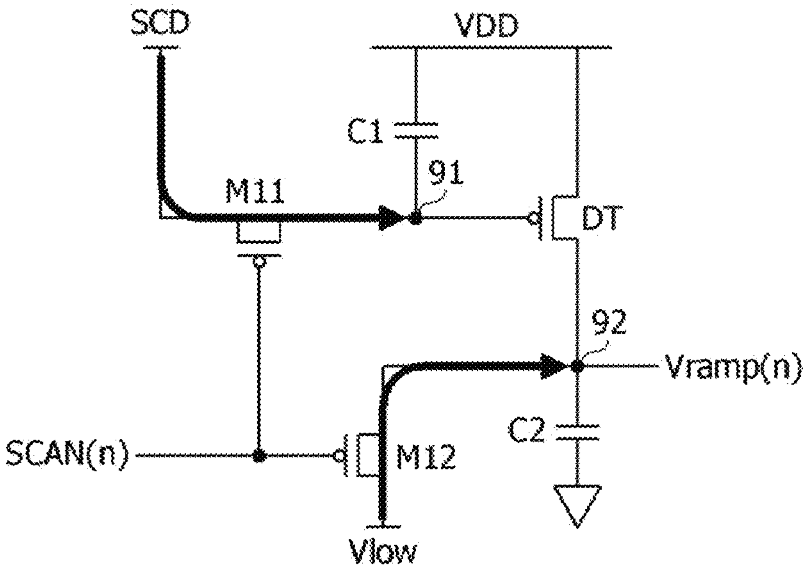
FIGS. 14A to 15B are diagrams illustrating the operation of the example ramp voltage generating circuit shown in FIG. 13.
Figure 14B:
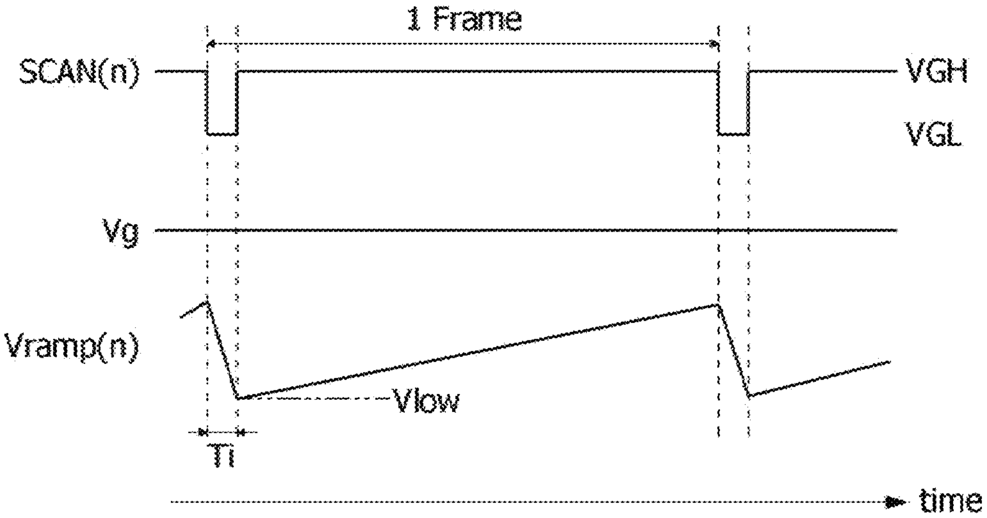

As illustrated in FIGS. 14A and 14B, the voltage of the nth scan signals SCAN(n) during the ramp period Ti is at the gate-on voltage VGL. Therefore, during the initialization period Ti, the first and second switch elements M11 and 12 may turn on simultaneously.

During the initialization period Ti, the slope data voltage SCD may be applied to the first node 91, and the reference voltage Vlow may be applied to the second node 91. At the end of the initialization period Ti, the voltage of the ramp voltage signal Vramp(n) may be the reference voltage Vlow.

Figure 15A:
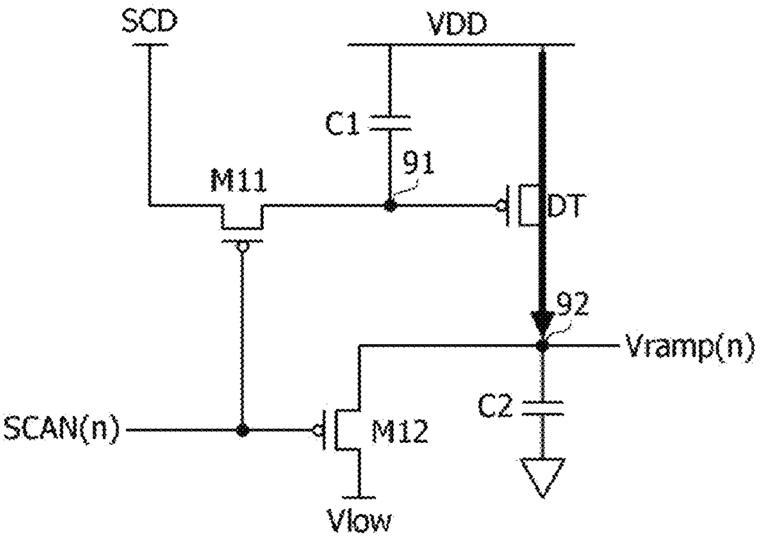
Figure 15B:
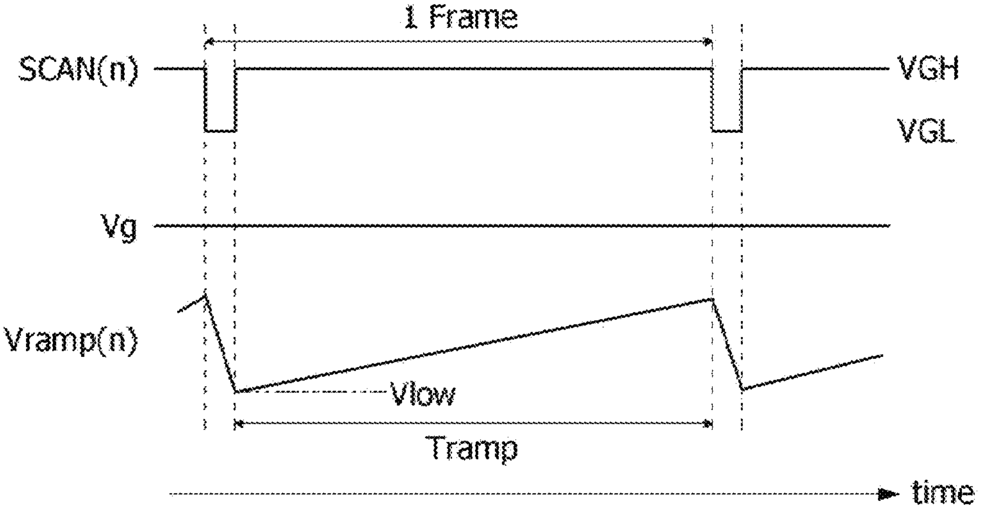

As shown in FIGS. 15A and 15B, the voltage of the nth scan signal SCAN(n) during the ramp period Tramp is at the gate-off voltage VGH. Therefore, during the ramp period Tramp, the first and second switch elements M11 and M12 are in the off state.

During the ramp period Tramp, the second capacitor C2 may be charged by the constant current from the driving element DT, and thus the voltage of the second node 92 may increase. Therefore, the voltage of the ramp voltage signal Vramp(n) applied to the pixel circuit may linearly increase over time during the ramp period Tramp.

Figure 16A:
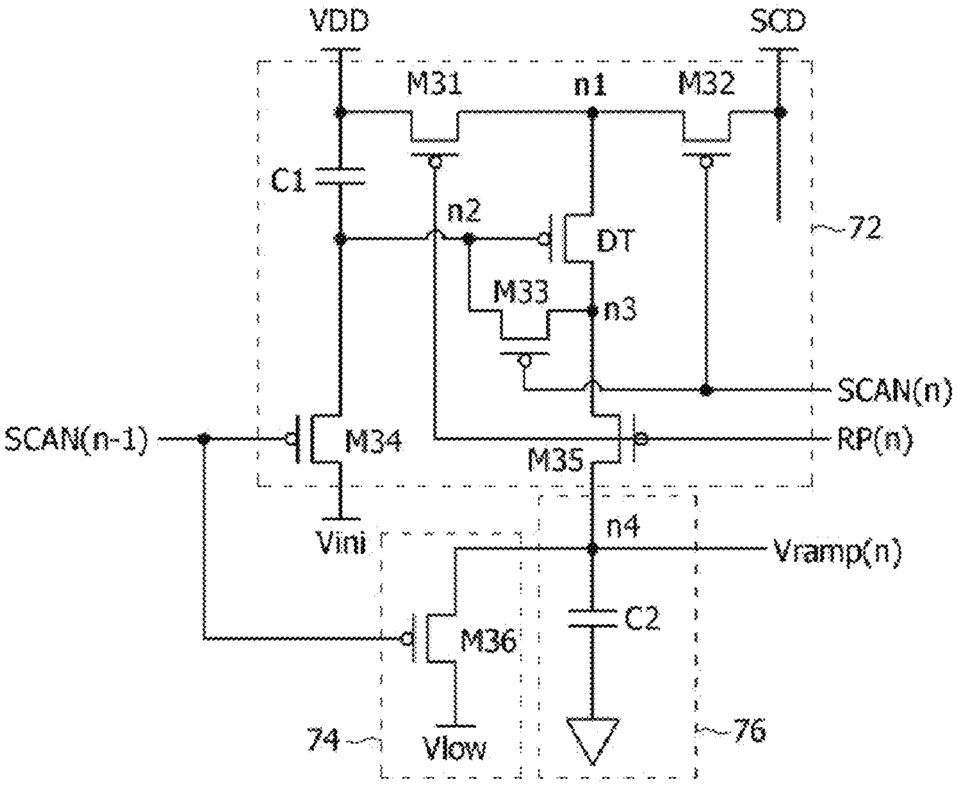
FIGS. 16A and 16B are circuit diagrams illustrating a ramp voltage generating circuit according to a third example embodiment of the present disclosure.
Figure 16B:
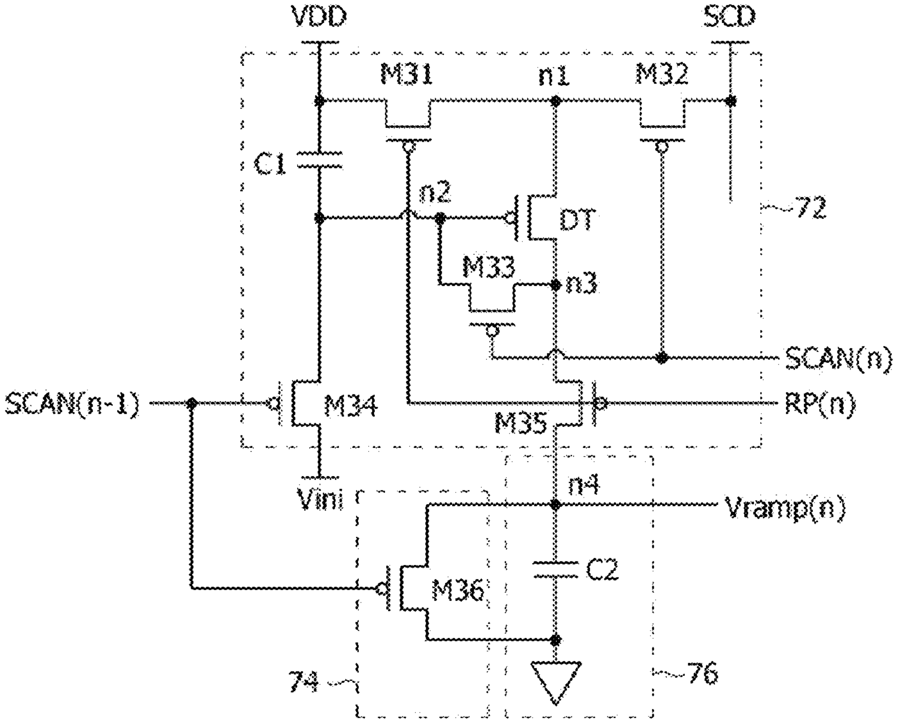
Figure 17:
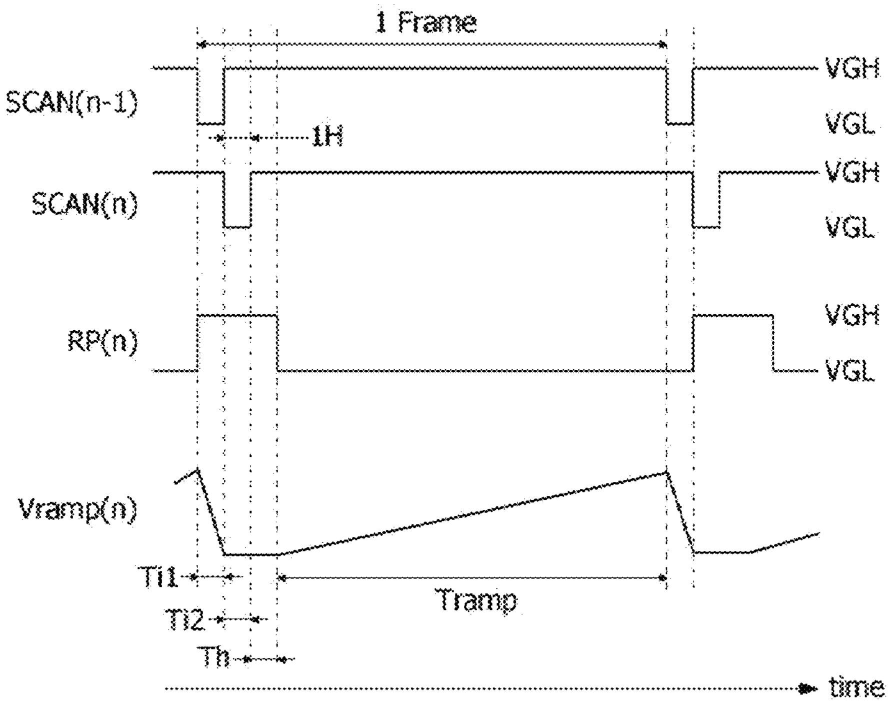
FIG. 17 is a waveform diagram illustrating one example of a gate signal applied to the example ramp voltage generating circuit shown in FIGS. 16A and 16B, and a ramp voltage signal output from the ramp voltage generating circuit.

FIGS. 16A and 16B are circuit diagrams illustrating a ramp voltage generating circuit according to a third example embodiment of the present disclosure. The ramp voltage generating circuit shown in FIGS. 16A and 16B is an example of an nth ramp voltage generating circuit 701. FIG. 17 is a waveform diagram illustrating one example of a gate signal applied to the ramp voltage generating circuit shown in FIGS. 16A and 16B and of a ramp voltage signal output from the ramp voltage generating circuit. FIGS. 18A to 20B are diagrams illustrating the operation of the example ramp voltage generating circuit shown in FIGS. 16A and 16B. The components of this example embodiment that are substantially the same as those of the preceding example embodiments and may not be described in detail.

As illustrated in FIGS. 16A to 17, the ramp voltage generating circuit may include a current generation circuit 72, a ramp waveform control circuit 74, and a charging circuit 76. The current generating circuit 72 may receive the gate signals to generate a current. The gate signals may include the (n−1)th scan signal SCAN(n−1), the nth scan signal SCAN(n), and the ramp switching signal RP(n). Instead of the ramp switching signal RP(n), an emission signal EM may be input to the current generating circuit 72. The current generating circuit 72 may include a compensation circuit to sample a threshold voltage of the driving element DT and compensate for the gate-to-source voltage of the driving element DT by the threshold voltage.

The ramp waveform control circuit 74 may control the waveform of the ramp voltage signal by initializing the charging circuit 76 and adjusting the amount of electric charge charged to the charging circuit 76. The charging circuit 76 may charge the electric charge from the current generating circuit 72.

The example ramp voltage generating circuits shown in FIGS. 16A and 16B may receive the driving voltage VDD, the initialization voltage Vini, the reference voltage Vlow, the (n−1)th scan signal SCAN(n−1), the nth scan signal SCAN(n), the ramp switching signal RP(n), and the slope data voltage SCD, and may output a ramp voltage signal Vramp(n). The driving voltage VDD may be a constant voltage selected from 5 V to 15 V, and the initialization voltage Vini and the reference voltage Vlow may be a constant voltage selected from −5 V to 5 V, but the present disclosure is not limited thereto. The initialization voltage Vini and the reference voltage Vlow may be set to one constant voltage with the same voltage level, or they may be set respectively to different constant voltages with different voltage levels. The slope data voltage SCD may be selected from, but is not limited to, a voltage between 0 and 10 V. The gate-off voltage VGH of the gate signals SCAN(n−1), SCAN(n), and RP(n) may be a voltage selected from 5 V to 15 V, and the gate-on voltage VGL thereof may be a voltage selected from −10 V to 5 V, but the present disclosure is not limited thereto.

The current generating circuit 72 may include a first to fifth switch elements M31 to M35, a first capacitor C1, and a driving element DT. The ramp waveform control circuit 74 may include a sixth switch element M36. The charging circuit 76 may include a second capacitor C2. The switch elements M31 to M36 and the driving element DT may be implemented as p-channel transistors but are not limited thereto. Each of the switch elements M31 to M36 may turn on in response to the gate-on voltage VGL and may turn off in response to the gate-off voltage VGH.

The driving device DT may be connected between a first node n1, to which the driving voltage VDD is applied, and a third node n3 to generate a current according to the gate-to-source voltage. The first capacitor C1 may charge the gate-source voltage Vgs of the driving element DT. The driving element DT may include a first electrode connected to the first node n1, a gate electrode connected to the second node n2, and a second electrode connected to a third node n3. The first capacitor C1 may be connected between a VDD node, to which the pixel driving voltage VDD is applied, and the second node n2.

A first switch element M31 may be connected between the VDD node and the first node n1 and may turn on in response to the gate-on voltage VGL of the ramp switching signal RP(n). When the first switch element M31 is turned on, the VDD node may be electrically connected to the first node n1. The first switch element M31 may include a first electrode connected to the VDD node, a gate electrode to which the ramp switching signal RP(n) is applied, and a second electrode connected to the first node n1.

A second switch element M32 may be connected between the slope data line SL (see, e.g., FIG. 7) to which the slope data voltage SCD is applied and the first node n1, and may turn on in response to the gate-on voltage VGL of the nth scan signal SCAN(n). When the second switch element M32 is turned on, the slope data line SL may be electrically connected to the first node n1. The second switch element M32 may include a first electrode connected to the slope data line SL to which the slope data voltage SCD is applied, a gate electrode to which the nth scan signal SCAN(N) may be applied, and a second electrode connected to the first node n1.

A third switch element M33 may be connected between the second node n2 and the third node n3 and may turn on in response to the gate-on voltage VGL of the nth scan signal SCAN(n). When the third switch element M33 is turned on, the second node n2 may be electrically connected to the third node n3. The third switch element M33 may include a first electrode connected to the second node n2, a gate electrode to which the nth scan signal SCAN(n) may be applied, and a second electrode connected to the third node n3.

A fourth switch element M34 may be connected between the second node n2 and an initialization voltage node to which the initialization voltage Vini is applied and may turn on in response to the gate-on voltage VGL of the (n−1)th scan signal SCAN(n−1). When the fourth switch element M34 is turned on, the second node n2 may be electrically connected to the initialization voltage (Vini) node. The fourth switch element M34 may include a first electrode connected to the second node n2, a gate electrode to which the (n−1)th scan signal SCAN(n−1) may be applied, and a second electrode connected to the initialization voltage (Vini) node.

A fifth switch element M35 may be connected between the third node n3 and a fourth node n4 and may turn on in response to the gate-on voltage VGL of the ramp switching signal RP(n). When the fifth switch element M35 is turned on, the third node n3 may be electrically connected to the fourth node n4. The fifth switch element M35 may include a first electrode connected to the third node n3, a gate electrode to which the ramp switching signal RP(n) may be applied, and a second electrode connected to the fourth node n4.

A sixth switch element M36 may be connected between the fourth node n4 and a reference voltage node to which the reference voltage Vlow is applied and may turn on in response to the gate-on voltage VGL of the (n−1)th scan signal SCAN(n−1). The voltage at the fourth node n4 may be equal to the ramp voltage signal Vramp(n). The fourth node n4 may be connected to the pixel circuit of the pixels 101 through a gate line. When the sixth switch element M36 is turned on, the reference voltage (Vlow) node may be electrically connected to the fourth node n4 so that the reference voltage Vlow is applied to the fourth node n4. The sixth switch element M36 may include a first electrode connected to the fourth node n4, a gate electrode to which the (n−1)th scan signal SCAN(n−1) may be applied, and a second electrode connected to the reference voltage (Vlow) node or the ground node GND. As shown in FIG. 16A, the second electrode of the sixth switch element M36 may be connected to the reference voltage (Vlow) node. As shown in FIG. 16B, in another example, a second capacitor C2 together with the second electrode of the sixth switch element M36 may be commonly connected to the ground node GND.

The second capacitor C2 may be connected between the fourth node n4 and the ground node GND, or between the fourth node n4 and the reference voltage (Vlow) node. Although FIGS. 16A and 16B illustrate examples in which the second capacitor C2 is connected to the ground node GND, the second capacitor C2 may be commonly connected together with the sixth switch element M36 to the reference voltage (Vlow) node.

As shown in FIG. 17, the driving period of the example ramp voltage generating circuit shown in FIGS. 16A and 16B may be divided into an initialization period Ti1, a programming period Ti2, and a ramp period Tramp. A hold period Th in which the first to sixth switch elements M31 to M36 are in an off state may be set between the programming period Ti2 and the ramp period Tramp. Pulses of the (n−1)th and nth scan signals SCAN(n−1) and SCAN(n) may be generated with a pulse width of one horizontal period (1H). The pulses of the (n−1)th and nth scan signals SCAN(n−1) and SCAN(n) may be generated as a gate-on voltage VGL during one horizontal period (1H). After the pulse of the (n−1) scan signal SCAN(n−1) is generated in the initialization period Ti1, the pulse of the nth scan signal SCAN(n) may be generated in the programming period Ti2. The pulse of the ramp switching signal RP(n) may be generated as a gate-off voltage VGH during two horizontal periods or three horizontal periods including the initialization period Ti1 and the programming period Ti2. The pulse of the ramp switching signal RP(n) may overlap the pulses of the (n−1)th and the nth scan signals SCAN(n−1) and SCAN(n).

Figure 18A:
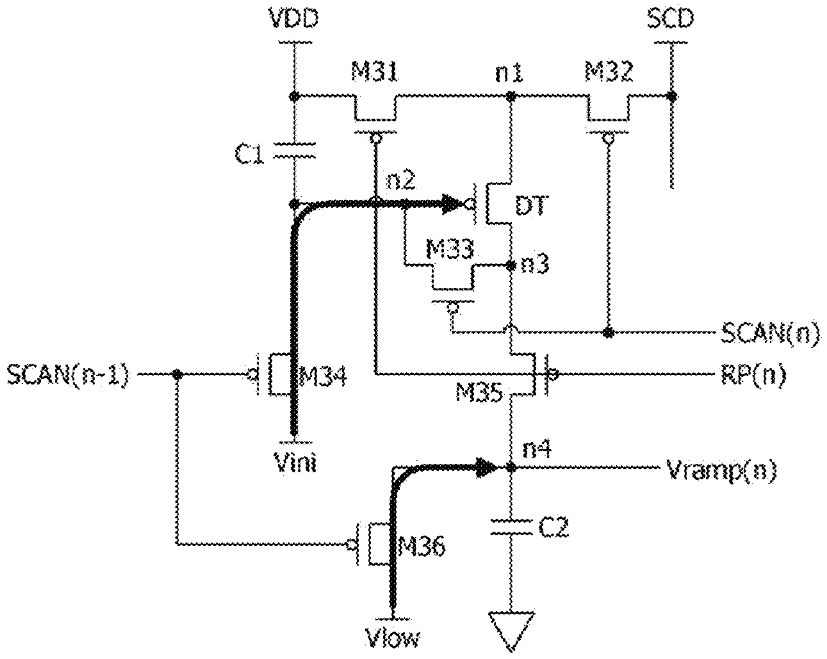
FIGS. 18A to 20B are diagrams illustrating the operation of the example ramp voltage generating circuit shown in FIGS. 16A and 16B.
Figure 18B:
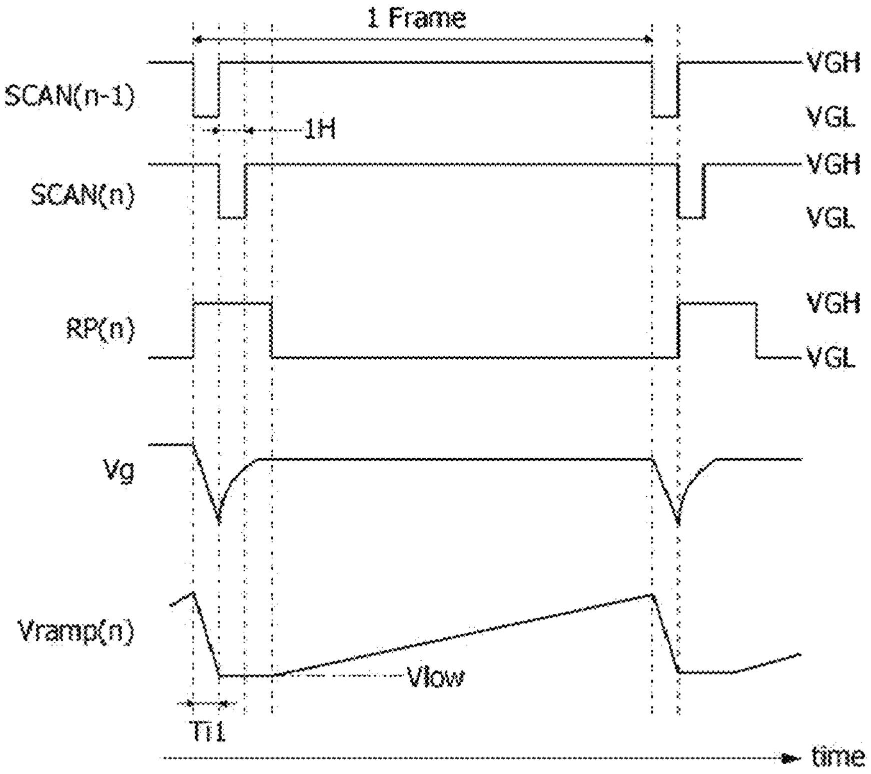

As shown in FIGS. 18A and 18B, during the initialization period Ti1, the voltage of the (n−1)th scan signal SCAN(n−1) is at the gate-on voltage VGL, and the voltage of the nth scan signal SCAN(n) and the ramp switching signal RP(n) is at the gate-off voltage VGH. Therefore, during the initialization period Ti, the fourth and the sixth switch elements M34 and M36 may turn on, while the first, second, third, and fifth switch elements M31, M32, M33, and M35 may turn off.

During the initialization period Ti1, the second node n2 may be initialized to the initialization voltage Vini, and the fourth node n4 may be initialized to the reference voltage Vlow. Therefore, during the initialization period, the voltage Vg of the second node n2 may be lowered to the initialization voltage Vini, and the voltage of the ramp voltage signal Vramp(n) may be lowered to the reference voltage Vlow. During the initialization period Ti, a current may be generated from the driving element DT, but this current may be discharged to the reference voltage (Vlow) node via the sixth switch element M36 at the "on" state and may not charge a second capacitor C2.

Figure 19A:
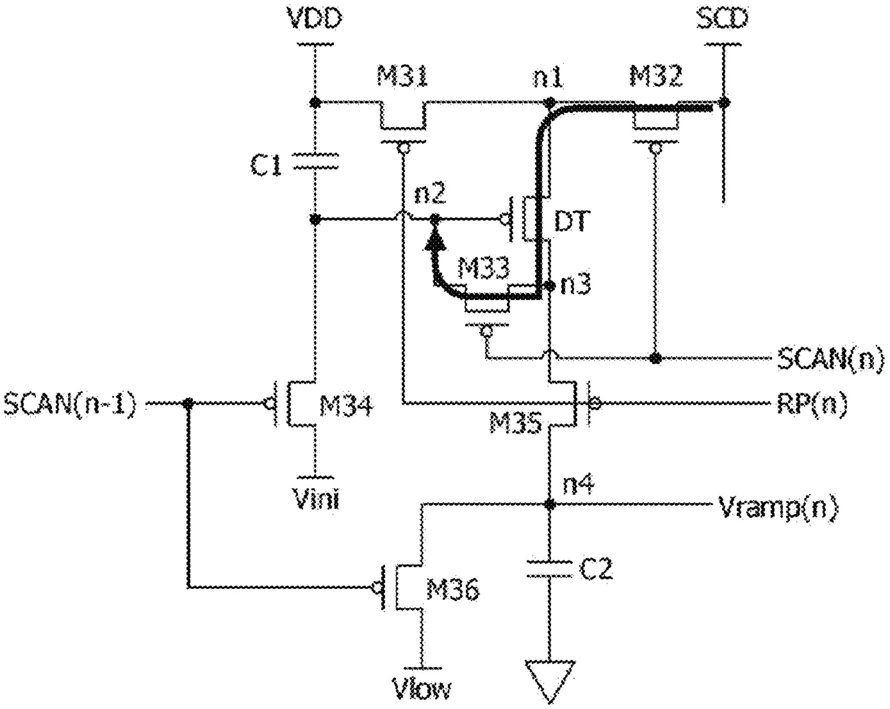
Figure 19B:
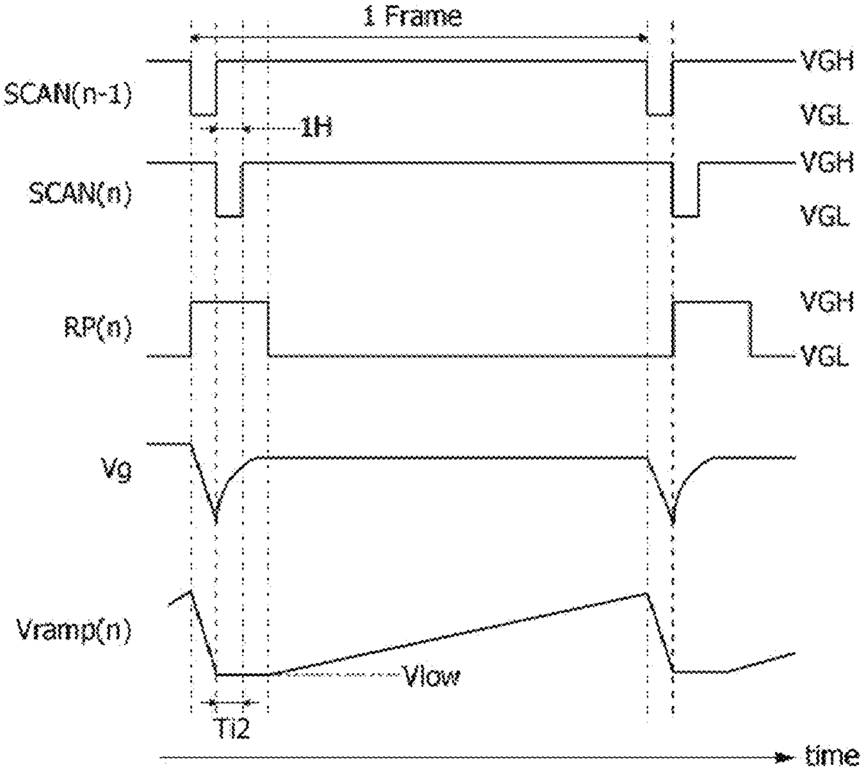

As shown in FIGS. 19A and 19B, during the programming period Ti2, the voltage of the (n−1)th scan signal SCAN(n−1) and the ramp switching signal RP(n) is at the gate-off voltage VGH, and the voltage of the nth scan signal SCAN(n)) is at the gate-on voltage VGL. Therefore, during the programming period Ti2, the second and third switch elements M32 and M33 may turn on, while the first, fourth, fifth, and sixth switch elements M31, M34, M35, and M36 may turn off.

During the programming period Ti2, the slope data voltage SCD may be applied to the second node n2 through the first node n1, a channel of the driving element DT, the third node n3, and a channel of the third switch element M33. In the programming period Ti2, the voltage at the second node n2 may become a slope data voltage SCD compensated by the threshold voltage Vth of the driving element DT, i.e., SCD−Vth. Therefore, at the end of the programming period Ti2, the voltage of the first capacitor C1 may become VDD−(SCD−Vth).

During the programming period Ti2, since the fifth switch element M35 is in an off state, the fourth node n4 may be floating so that the voltage of the ramp voltage signal Vramp(n) may be maintained at the reference voltage Vlow.

During the hold period Th following the programming period Ti2, the voltages of the (n−1)th scan signal SCAN (n−1), the nth scan signal SCAN(n), and the ramp switching signal RP(n) are at the gate-off voltage VGH. Therefore, during the hold period Th, the first to the sixth switch elements M31 to M36 may turn off so that the voltages at the first to the fourth nodes n1 to n4 may be maintained at the voltages at the end of the programming period Ti2.

Figure 20A:
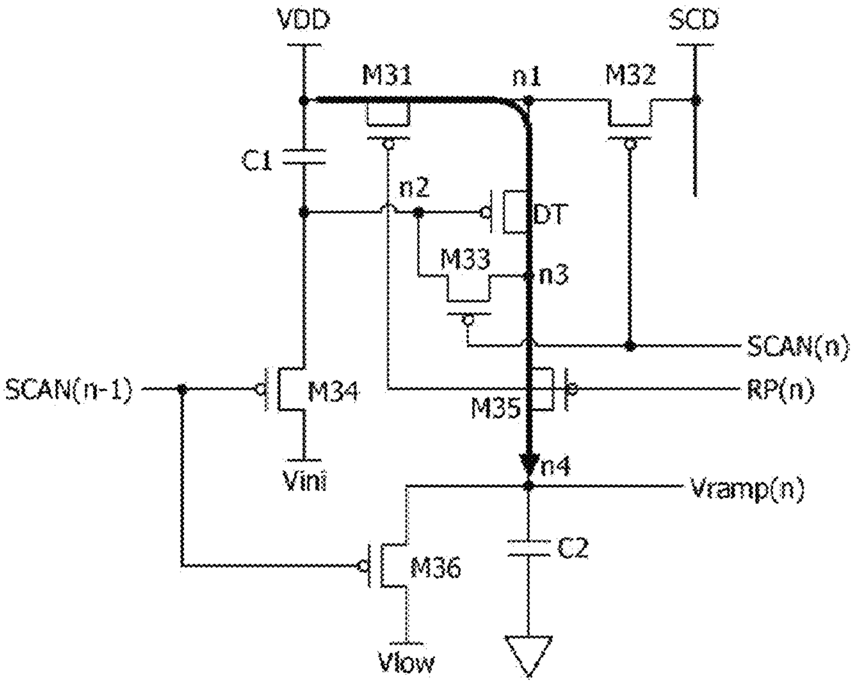
Figure 20B:
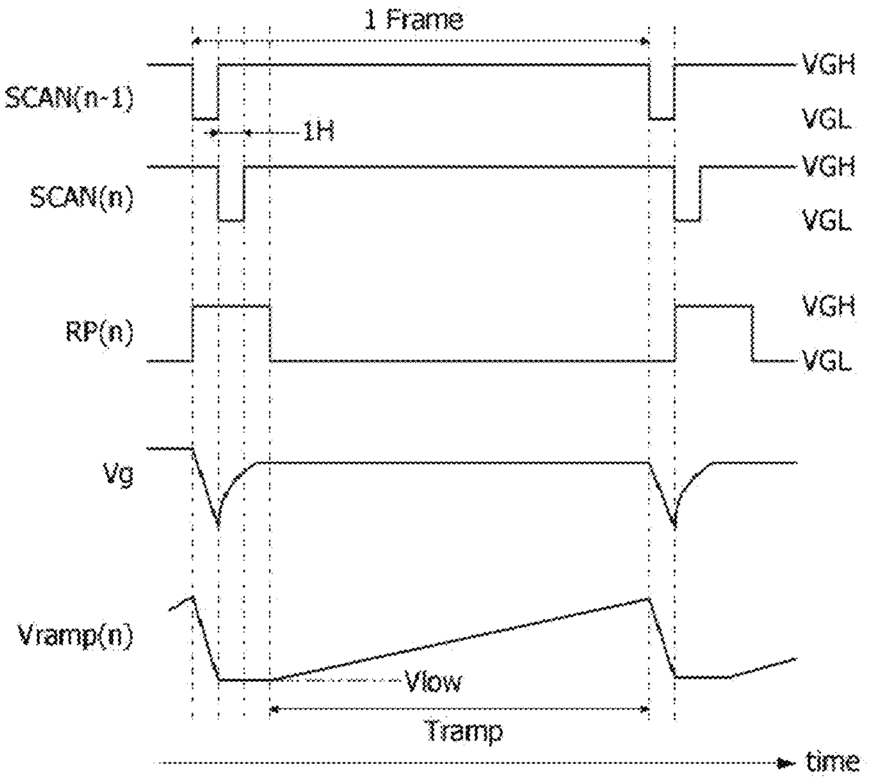

As illustrated in FIGS. 20A and 20B, during the ramp period Tramp, voltages of the (n−1)th and nth scan signals SCAN(n−1) and SCAN(n) are at the gate-off voltage VGH, and a voltage of the ramp switching signal RP(n) is at the gate-on voltage VGL. Therefore, during the ramp period Tramp, the first and the fifth switch elements M31 and M35 may turn on, while the second, third, fourth, and sixth switch elements M32, M33, M34, and M36 may turn off.

During the ramp period Tramp, the second capacitor C2 may be charged by the constant current from the driving element DT, causing the voltage at the fourth node n4 to increase. Therefore, the voltage of the ramp voltage signal Vramp(n) applied to the pixel circuit may linearly increase over time during the ramp period Tramp.

Figure 21:
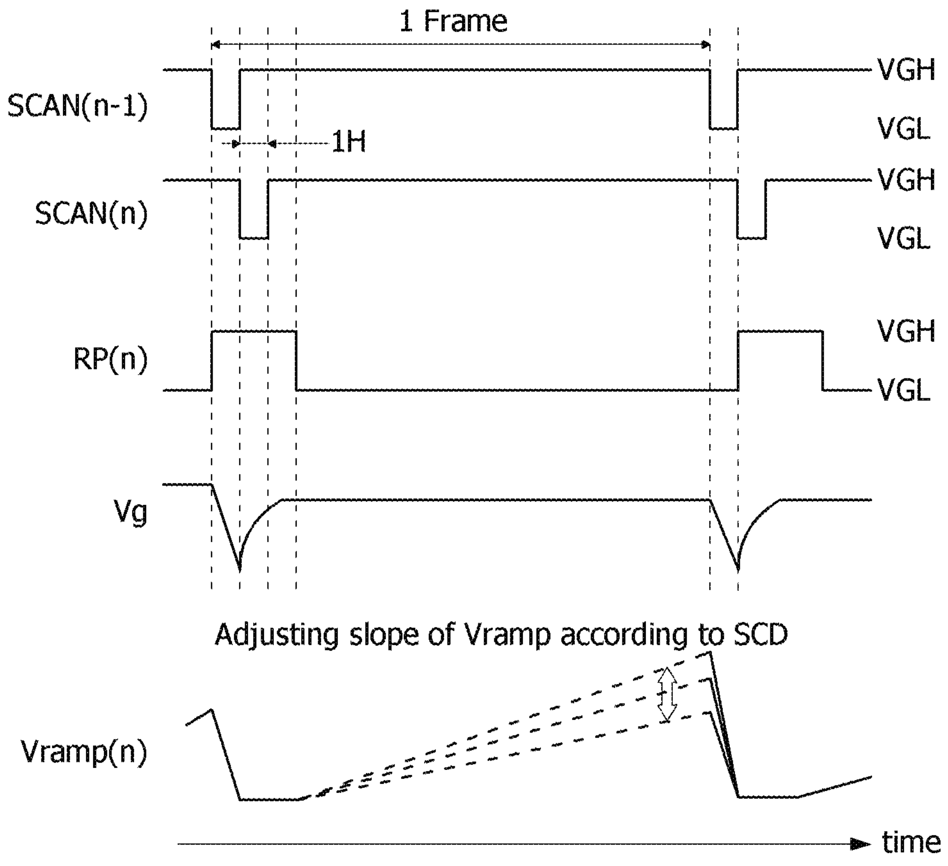
FIG. 21 is a waveform diagram illustrating a slope of a ramp voltage signal that varies with a slope data voltage.

FIG. 21 is a waveform illustrating a slope of the ramp voltage signal Vramp that varies with the slope data voltage SCD.

As illustrated in FIG. 21, a minimum voltage and a maximum voltage of the ramp voltage signal Vramp for obtaining a target luminance of the pixels may be determined according to the characteristics of the display panel 100. The amount of current flowing through the driving element DT to the light-emitting element LD may be varied by the slope data voltage SCD. For example, in the example ramp voltage generating circuits shown in FIGS. 16A to 20B, the higher the slope data voltage SCD, the lower the gate-source voltage of the driving element DT, thus reducing the amount of current, whereas the lower the slope data voltage SCD, the higher the gate-source voltage of the driving element DT, thus increasing the amount of current. Therefore, the slope of the ramp voltage signal Vramp(n) may be varied with the slope data voltage SCD so that the maximum voltage of the ramp voltage signal Vramp(n) is adjusted within a defined period, for example, one frame period.

The ramp voltage signal Vramp(n) may control the switch element M1 of the example pixel circuit shown in FIG. 4. In this case, a lighting time ON of the light-emitting element LD may be varied with the slope of the ramp voltage signal Vramp(n) to adjust the luminance of the pixel.

Figure 22:
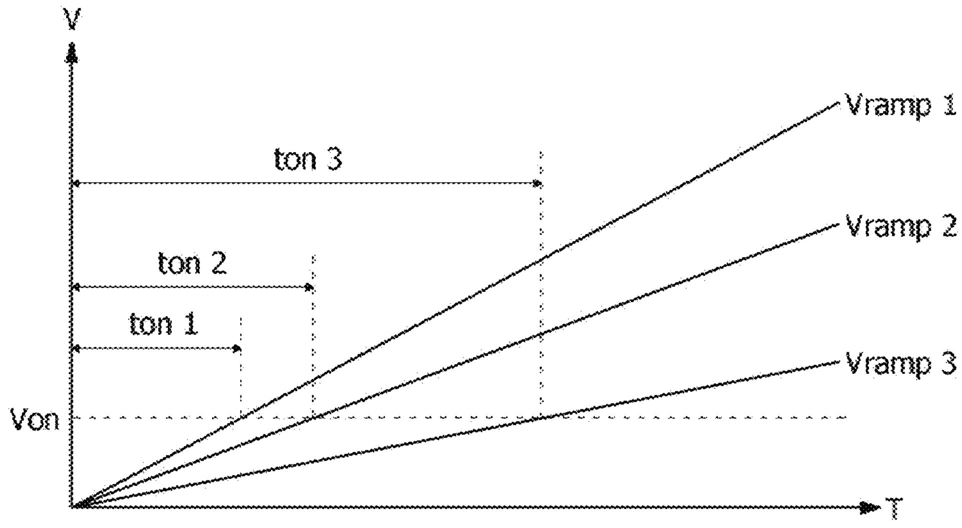
FIG. 22 is a waveform diagram illustrating an example in which a lighting time of a light-emitting element varies with a slope of a ramp voltage signal.

As shown in FIG. 22, the turn-on periods ton1, ton2, and ton3 during which the switch element M1 is turned on may vary with the slope of the ramp voltage signal Vramp(n). In FIG. 22, "Von" denotes the turn-on voltage of the switch element M1. In FIG. 22, the horizontal axis represents time (T), and the vertical axis represents voltage (V). As the turn-on periods ton1, ton2, and ton3 of the switch element M1 increase, the lighting time of the light-emitting element LD increases, which increases the luminance of the pixel. For the first ramp voltage signal Vramp1 with a large slope, the turn-on period ton1 of the switch element M1 is relatively short, whereas for the third ramp voltage signal Vramp3 with a smaller slope, the turn-on period ton3 of the switch element M1 becomes longer. For a second ramp voltage signal Vramp2 with a medium slope, the turn-on period ton2 of the switch element M1 is approximately medium. Therefore, by applying the ramp voltage signal Vramp to the pixel circuit and selecting its slope appropriately, the luminance of the pixel may be fine-tuned to improve the grayscale representation for each grayscale. In addition, the color of the pixels may be appropriately adjusted by differentially applying the slope and maximum voltage of the ramp voltage signal Vramp for each color of the sub-pixels.

According to one or more example embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more example embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims. Thus, the scope of the claims is not limited to the above description of the present disclosure.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A gate driving circuit, comprising:

a gate signal generating circuit configured to sequentially output at least one gate signal having a square wave pulse; and a ramp voltage generating circuit configured to receive the at least one gate signal and a slope data voltage and to output a ramp voltage signal including a ramp waveform based on the square wave pulse of the at least one gate signal and on the slope data voltage, wherein the slope data voltage is an input to the gate driving circuit and corresponds to a slope of the ramp waveform of the ramp voltage signal.

2. The gate driving circuit of claim 1, wherein:

the at least one gate signal includes a (n−1)th scan signal and an nth scan signal following the (n−1)th scan signal, n being a natural number;

the ramp voltage generating circuit includes:

a driving transistor including a first electrode configured to receive a driving voltage, a gate electrode connected to a first node, and a second electrode connected to a second node;

a first capacitor connected between a VDD node configured to receive a driving voltage and the first node;

a first switch transistor connected between a data line configured to receive the slope data voltage and the first node, the first switching transistor being configured to turn on in response to a gate-on voltage of the nth scan signal;

a second switch transistor connected between the second node and a reference voltage node configured to receive a reference voltage lower than the driving voltage, or connected between the second node and a ground node, the second switch transistor being configured to turn on in response to a gate-on voltage of the (n−1)th scan signal; and a second capacitor connected between the second node and the ground node, or connected between the second node and the reference voltage node; and the square wave pulse of the (n−1)th scan signal has the gate-on voltage of the (n−1)th scan signal, and the square wave pulse of the nth scan signal has the gate-on voltage of the nth scan signal.

3. The gate driving circuit of claim 1, wherein:

the at least one gate signal includes a scan signal;

the ramp voltage generating circuit includes:

a driving transistor including a first electrode configured to receive a driving voltage, a gate electrode connected to a first node, and a second electrode connected to a second node;

a first capacitor connected between a VDD node configured to receive the driving voltage and the first node;

a first switch transistor connected between a data line configured to receive the slope data voltage and the first node, the first switch transistor being configured to turn on in response to a gate-on voltage of the scan signal;

a second switch transistor connected between the second node and a reference voltage node configured to receive a reference voltage lower than the driving voltage, or connected between the second node and a ground node, the second switch transistor being configured to turn on in response to the gate-on voltage of the scan signal; and a second capacitor connected between the second node and the ground node, or connected between the second node and the reference voltage node; and the square wave pulse of the scan signal has the gate-on voltage.

4. The gate driving circuit of claim 1, wherein:

the at least one gate signal includes a (n−1)th scan signal, an nth scan signal following the (n−1)th scan signal, and a ramp switching signal, n being a natural number;

the square wave pulse of the ramp switching signal overlaps the square wave pulse of the (n−1)th scan signal and the square wave pulse of the nth scan signal;

the ramp voltage generating circuit includes:

a driving transistor including a first electrode connected to a first node, a gate electrode connected to a second node, and a second electrode connected to a third node;

a first capacitor connected between a VDD node configured to receive a driving voltage and the second node;

a first switch transistor connected between the VDD node and the first node and configured to turn on in response to a gate-on voltage of the ramp switching signal;

a second switch transistor connected between a data line configured to receive the slope data voltage and the first node, and configured to turn on in response to a gate-on voltage of the nth scan signal;

a third switch transistor connected between the second node and the third node and configured to turn on in response to the gate-on voltage of the nth scan signal;

a fourth switch transistor connected between the second node and an initialization voltage node configured to receive an initialization voltage, and configured to turn on in response to a gate-on voltage of the (n−1)th scan signal;

a fifth switch transistor connected between the third node and a fourth node and configured to turn on in response to the gate-on voltage of the ramp switching signal;

a sixth switch transistor connected between the fourth node and a reference voltage node configured to receive a reference voltage, or connected between the fourth node and a ground node, the sixth switch transistor being configured to turn on in response to the gate-on voltage of the (n−1)th scan signal; and a second capacitor connected between the fourth node and the reference voltage node, or connected between the fourth node and the ground node;

the square wave pulse of the (n−1)th scan signal has the gate-on voltage of the (n−1)th scan signal, and the square wave pulse of the nth scan signal has the gate-on voltage of the nth scan signal; and the square wave pulse of the ramp switching signal has a gate-off voltage, and the ramp switching signal is at the gate-on voltage following the square wave pulse of the ramp switching signal.

5. The gate driving circuit of claim 4, wherein:

the first switch transistor includes a first electrode connected to the VDD node, a gate electrode configured to receive the ramp switching signal, and a second electrode connected to the first node;

the second switch transistor includes a first electrode connected to the data line, a gate electrode configured to receive the nth scan signal, and a second electrode connected to the first node;

the third switch transistor includes a first electrode connected to the second node, a gate electrode configured to receive the nth scan signal, and a second electrode connected to the third node;

the fourth switch transistor includes a first electrode connected to the second node, a gate electrode configured to receive the (n−1)th scan signal, and a second electrode connected to the initialization voltage node;

the fifth switch transistor includes a first electrode connected to the third node, a gate electrode configured to receive the ramp switching signal and a second electrode connected to the fourth node; and the sixth switch transistor includes a first electrode connected to the fourth node, a gate electrode configured to receive the (n−1)th scan signal, and a second electrode connected to the reference voltage node or the ground node.

6. The gate driving circuit of claim 1, wherein:

a degree of the slope of the ramp waveform of the ramp signal varies based on a change in the slope data voltage.

7. The gate driving circuit of claim 1, wherein:

the ramp voltage generating circuit has a driving period including an initialization period and a ramp period following the initialization period;

during the initialization period, a voltage of the ramp voltage signal is configured to decrease to a reference voltage; and during the ramp period, the voltage of the ramp voltage signal is configured to gradually increase higher than the reference voltage to have the ramp waveform.

8. The gate driving circuit of claim 7, wherein, during the ramp period, the voltage of the ramp voltage signal is configured to increase gradually from the reference voltage.

9. The gate driving circuit of claim 8, wherein:

the driving period further includes a hold period between the initialization period and the ramp period; and during the hold period, the ramp voltage signal is configured to be maintained at the reference voltage.

10. The gate driving circuit of claim 7, wherein:

the driving period further includes a programming period between the initialization period and the ramp period;

during the programming period, the voltage of the ramp voltage signal is configured gradually increase from the reference voltage; and during the ramp period, the voltage of the ramp voltage signal is configured to continue gradually increasing following the gradual increase in the programming period.

11. A display device, comprising:

a display panel including a plurality of data lines, a plurality of gate lines, and a plurality of pixel circuits;

a data driver configured to output a data voltage of pixel data to the pixel circuits respectively through the data lines; and a gate driver configured to output at least one gate signal including a square wave pulse and a ramp voltage signal including a ramp waveform to the pixel circuits respectively through the gate lines, wherein the gate driver includes a ramp voltage generating circuit configured to receive the at least one gate signal and a slope data voltage and to output the ramp voltage signal based on the square wave pulse of the at least one gate signal and on the slope data voltage, and wherein the ramp voltage generating circuit is further configured to receive the slope data voltage from at least one of the data driver and another component of the display device, and the ramp voltage signal has a waveform with a slope corresponding to the slope data voltage.

12. The display device of claim 11, wherein each of the plurality of pixel circuits includes:

a current generating circuit configured to receive a pixel driving voltage and output a constant current;

a pulse width control circuit configured to receive the data voltage of pixel data and the ramp voltage signal and to output a pulse width modulation (PWM) signal; and a switch transistor configured to switch the current flowing through a light-emitting element in response to the PWM signal.

13. The display device of claim 11, wherein the gate driver further includes:

a gate signal generating circuit configured to sequentially output the at least one gate signal including the square wave pulse.

14. The display device of claim 13, wherein:

the at least one gate signal includes a (n−1)th scan signal and an nth scan signal following the (n−1)th scan signal, n being a natural number;

the ramp voltage generating circuit includes:

a driving transistor including a first electrode configured to receive a driving voltage, a gate electrode connected to a first node, and a second electrode connected to a second node;

a first capacitor connected between a VDD node configured to receive the driving voltage and the first node;

a first switch transistor connected between a data line, among the data lines, configured to receive the slope data voltage and the first node, the first switching transistor being configured to turn on in response to a gate-on voltage of the nth scan signal;

a second switch transistor connected between the second node and a reference voltage node configured to receive a reference voltage lower than the driving voltage, or connected between the second node and a ground node, the second switch transistor being configured to turn on in response to a gate-on voltage of the (n−1)th scan signal; and a second capacitor connected between the second node and the ground node, or connected between the second node and the reference voltage node; and the square wave pulse of the (n−1)th scan signal has the gate-on voltage of the (n−1)th scan signal, and the square wave pulse of the nth scan signal has the gate-on voltage of the nth scan signal.

15. The display device of claim 13, wherein:

the at least one gate signal includes a scan signal;

the ramp voltage generating circuit includes:

a driving transistor including a first electrode configured to receive a driving voltage, a gate electrode connected to a first node, and a second electrode connected to a second node;

a first capacitor connected between a VDD node configured to receive the driving voltage and the first node;

a first switch transistor connected between a data line, among the data lines, configured to receive the slope data voltage and the first node, the first switch transistor being configured to turn on in response to a gate-on voltage of the scan signal;

a second switch transistor connected between the second node and a reference voltage node configured to receive a reference voltage lower than the driving voltage, or connected between the second node and a ground node, the second switch transistor being configured to turn on in response to a gate-on voltage of the scan signal; and a second capacitor connected between the second node and the ground node, or connected between the second node and the reference voltage node; and the square wave pulse of the scan signal has the gate-on voltage.

16. The display device of claim 13, wherein:

the at least one gate signal includes a (n−1)th scan signal, an nth scan signal following the (n−1)th scan signal, and a ramp switching signal, n being a natural number;

the square wave a pulse of the ramp switching signal overlaps the square wave pulse of the (n−1)th scan signal and the square wave pulse of the nth scan signal;

the ramp voltage generating circuit includes:

a driving transistor including a first electrode connected to a first node, a gate electrode connected to a second node, and a second electrode connected to a third node;

a first capacitor connected between a VDD node configured to receive a driving voltage and the second node;

a first switch transistor connected between the VDD node and the first node and configured to turn on in response to a gate-on voltage of the ramp switching signal;

a second switch transistor connected between a data line, among the data lines, configured to receive the slope data voltage and the first node, the second switch transistor being configured to turn on in response to a gate-on voltage of the nth scan signal;

a third switch transistor connected between the second node and the third node and configured to turn on in response to the gate-on voltage of the nth scan signal;

a fourth switch transistor connected between the second node and an initialization voltage node configured to receive an initialization voltage, the fourth switch transistor being configured to turn on in response to a gate-on voltage of the (n−1)th scan signal;

a fifth switch transistor connected between the third node and a fourth node and configured to turn on in response to the gate-on voltage of the ramp switching signal;

a sixth switch transistor connected between the fourth node and a reference voltage node configured to receive a reference voltage, or connected between the fourth node and a ground node, the sixth switch transistor being configured to turn on in response to the gate-on voltage of the (n−1)th scan signal; and a second capacitor connected between the fourth node and the reference voltage node, or connected between the fourth node and the ground node; and the square wave pulse of the (n−1)th scan signal has the gate-on voltage of the (n−1)th scan signal, and the square wave pulse of the nth scan signal has the gate-on voltage of the nth scan signal; and the square wave pulse of the ramp switching signal has a gate-off voltage, and the ramp switching signal is at the gate-on voltage following the square wave pulse of the ramp switching signal.

17. The display device of claim 13, wherein:
a degree of the slope of the ramp waveform of the ramp voltage signal varies based on a change in the slope data voltage.

18. The display device of claim 13, wherein:
the ramp voltage generating circuit has a driving period including an initialization period and a ramp period following the initialization period;
during the initialization period, a voltage of the ramp voltage signal is configured to decrease to a reference voltage; and
during the ramp period, the voltage of the ramp voltage signal is configured to gradually increase higher than the reference voltage to have the ramp waveform.

19. The display device of claim 13, wherein the gate driver is further configured to:
output the at least one gate signal through at least one gate line, among the gate lines, corresponding to the at least one gate signal; and
output the ramp voltage signal through another gate line, among the gate lines, corresponding to the ramp voltage signal.

20. A display device, comprising:
a display panel including a plurality of data lines, a plurality of gate lines, and a plurality of pixel circuits;
a data driver configured to output a data voltage of pixel data to the pixel circuits respectively through the data lines; and
a gate driver configured to output at least one gate signal including a square wave pulse and a ramp voltage signal including a ramp waveform to the pixel circuits respectively through the gate lines,
wherein:
the at least one gate signal includes a scan signal and an emission signal;
each of the plurality of pixel circuits includes:
a pixel driving transistor, a pixel switch transistor, and a light-emitting element connected in series between a pixel driving voltage and a cathode voltage; and
a gate electrode of the pixel switch transistor is configured to receive the emission signal or the ramp voltage signal.

21. The display device of claim 20, wherein each of the plurality of pixel circuits further includes:
a compensation circuit configured to receive at least one of the scan signal, the emission signal, the ramp voltage signal, and the data voltage of pixel data, and connected to the pixel driving transistor and the pixel switch transistor.

* * * * *